US012387202B2

(12) United States Patent
Ramachandran et al.

(10) Patent No.: US 12,387,202 B2
(45) Date of Patent: Aug. 12, 2025

(54) SYSTEMS AND METHODS FOR MANAGING CRYPTOCURRENCY

(71) Applicant: Block, Inc., San Francisco, CA (US)

(72) Inventors: Shivaraman Ramachandran, Fremont, CA (US); Max Guise, San Francisco, CA (US); Justin Williams, New York, NY (US); Jesse Posner, San Francisco, CA (US); Alexander Schoof, Leesburg, VA (US); Jordan Mecom, San Francisco, CA (US); Arvin Aminpour, Redwood City, CA (US); Allison Moyer, San Francisco, CA (US); Kirill Zhukov, San Francisco, CA (US); David Robinson, Brunswick (AU); Bradley Ryan, Denver, CO (US); Ryan Lanman, San Francisco, CA (US); Lindsey Grossman, High Falls, NY (US)

(73) Assignee: Block, Inc., Oakland, CA (US)

( * ) Notice: Subject to any disclaimer, the term of this patent is extended or adjusted under 35 U.S.C. 154(b) by 166 days.

(21) Appl. No.: 17/855,408

(22) Filed: Jun. 30, 2022

(65) Prior Publication Data

US 2023/0004958 A1 Jan. 5, 2023

Related U.S. Application Data

(60) Provisional application No. 63/216,969, filed on Jun. 30, 2021.

(51) Int. Cl.
*G06Q 20/38* (2012.01)
*G06Q 20/22* (2012.01)
(Continued)

(52) U.S. Cl.
CPC ....... *G06Q 20/3825* (2013.01); *G06Q 20/223* (2013.01); *G06Q 20/322* (2013.01);
(Continued)

(58) Field of Classification Search
None
See application file for complete search history.

(56) References Cited

U.S. PATENT DOCUMENTS 10,248,953 B2 * 4/2019 Salama .................. G06Q 20/12
11,823,161 B2 * 11/2023 Shanmugam ........ G06Q 20/223
(Continued)

FOREIGN PATENT DOCUMENTS

WO WO-2019194803 A1 * 10/2019 ........... G06Q 20/065

OTHER PUBLICATIONS

Grimm, N. J., "A Low-Cost Contactless Micro-Payment Framework", University of Johannesburg, ProQuest Dissertations & Theses. (2014) (Year: 2014).*
(Continued)

*Primary Examiner* — Clay C Lee
(74) *Attorney, Agent, or Firm* — Polsinelli PC

(57) ABSTRACT

A system for locally authenticating a transaction of digital financial assets, such as cryptocurrency. A first device may locally store financial assets in non- volatile memory of the first device. The first device may use the locally-stored financial assets to conduct a local transaction with a second device. The first device may generate a transaction settlement data token and exchange the token with the second device, wherein the transaction settlement data token includes information specific to the local transaction, a value associated with the local transaction, and encrypted personal information associated with the first device. After receiving a confirmation of transmission from the second device, the (Continued)

value associated with the local transaction may be debited from the locally-stored financial assets.

18 Claims, 21 Drawing Sheets

(51) Int. Cl.
*G06Q 20/32* (2012.01)
*G06Q 20/40* (2012.01)
(52) U.S. Cl.
CPC ..... *G06Q 20/3278* (2013.01); *G06Q 20/3829* (2013.01); *G06Q 20/383* (2013.01); *G06Q 20/4014* (2013.01); *G06Q 20/40145* (2013.01); *G06Q 2220/00* (2013.01)

(56) References Cited

U.S. PATENT DOCUMENTS

| | | |
|---|---|---|
| 2014/0344106 A1 | 11/2014 | Lee et al. |
| 2015/0287026 A1 | 10/2015 | Yang et al. |
| 2016/0192106 A1 | 6/2016 | Fu et al. |
| 2017/0132633 A1 | 5/2017 | Whitehouse |
| 2017/0278174 A1 | 9/2017 | Harrell |
| 2018/0068293 A1* | 3/2018 | Dunne ............... G06Q 20/3672 |
| 2018/0367483 A1 | 12/2018 | Rodriguez et al. |
| 2019/0392468 A1 | 12/2019 | Stanciu et al. |
| 2020/0374113 A1* | 11/2020 | Noam .................. H04L 9/0637 |
| 2022/0101294 A1* | 3/2022 | Mahanti ............... G06Q 20/203 |
| 2022/0150692 A1* | 5/2022 | O'Kane ................ H04L 67/125 |
| 2022/0263651 A1 | 8/2022 | Mord et al. |
| 2022/0278843 A1 | 9/2022 | Wright et al. |
| 2022/0300964 A1 | 9/2022 | Chung |
| 2022/0393871 A1 | 12/2022 | Joseph et al. |
| 2022/0393891 A1 | 12/2022 | Mackcay et al. |
| 2022/0400020 A1 | 12/2022 | Davies et al. |
| 2022/0407728 A1 | 12/2022 | Snow |
| 2023/0065383 A1* | 3/2023 | Samuelsson ......... G06Q 20/389 |

OTHER PUBLICATIONS

Lopp J., "Bitcoin multisig hardware signing performance", Sep. 12, 2020, 23 pages.
Lopp J., "Bitcoin multisig time locking challenges", Apr. 9, 2020, 14 pages.
Lopp J., "Shamir's Secret Sharing shortcomings", Oct. 17, 2019, 12 pages.
Lopp Jameson, "Bitcoin multisig time locking challenges" Casablog, URL: <https://blog.keys.casa/bitcoin-multisig-time-locking-challenges/>, Retrived on May 26, 2023, 13 pages.

* cited by examiner

SYSTEMS AND METHODS FOR MANAGING CRYPTOCURRENCY

CROSS-REFERENCE TO RELATED APPLICATION

This application claims priority to U.S. Provisional Patent Application No. 63/216,969, filed on Jun. 30, 2021, which is incorporated herein by reference in its entirety.

TECHNICAL FIELD

Cryptocurrency, such as Bitcoin, is increasing in popularity and has many advantages. In this regard, cryptocurrency provides a digital form of currency that may be transferred from one party to another through a global computer network, such as the internet, thereby facilitating the storage and transfer of financial assets for financial transactions. However, cryptocurrency suffers from several drawbacks or perceived problems or disadvantages that have limited its adoption. For example, some users may perceive cryptocurrency as being vulnerable to loss, either through deliberate actions by malicious actors or through accidental loss of necessary access credentials. As another example, some users may be deterred from using cryptocurrency because of perceived complexity in managing cryptocurrency holdings, especially with regards to securely maintaining the cryptographic keys needed to access and control cryptocurrency assets.

In particular, users of cryptocurrency often face a choice between third-party custody and self-custody. In third-party custody, the owner depends on a third party to hold information, such as private keys, that are used in establishing ownership and transferring cryptocurrency. Such a solution may be appealing to users who do not wish to be burdened with many of the complexities of holding, processing, and transferring information related to the cryptocurrency. However, many users may be concerned about the security measures used by third-party custodians to keep the cryptocurrency secure and also retaining the ability to access the cryptocurrency from the third-party custodians, such as during bankruptcy or other unanticipated events, as well as the loss of credentials required by the third-party custodians. With self-custody, the owner must wade through the technical complexities associated with managing cryptocurrency and also deal with security concerns. Many users may also be concerned about their ability to access cryptocurrency in the event of the loss of or damage to hardware used to store and otherwise manage the cryptocurrency.

Another perceived issue with cryptocurrency transactions and, more generally, any digital form of payment (e.g., debit cards, credit cards, or mobile payment services) is the reliance on an active internet connection. Unlike with physical money where the transfer of value is effected by direct exchange of a physical object (i.e., a banknote or coin) between the parties, the transfer of value for transactions involving payment cards or mobile payment services is often done by third-parties on behalf of the buyer. Thus, these exchanges require some form of communication with these third-parties, which is often done over the internet.

This requirement can be problematic for the many occasions where internet service is unreliable or unavailable when consumers are looking to make financial transactions. In such situations, a lack of internet connectivity can be a significant impediment to both the sellers looking to sell their goods or services and to the buyers looking to acquire them. In addition, the nature of many in-person events and transactions typically results in an increased risk of fraud for the buyers and sellers. For many transactions, including transactions between private parties, a person wishing to transfer funds to another person may be reluctant to provide the other person with private information, such as credit card or debit card numbers.

BRIEF DESCRIPTION OF THE DRAWINGS

Embodiments and various aspects of the present disclosure are illustrated in the following detailed description and the accompanying figures. The various features shown in the figures may not be drawn to scale.

DETAILED DESCRIPTION

Figure 1:
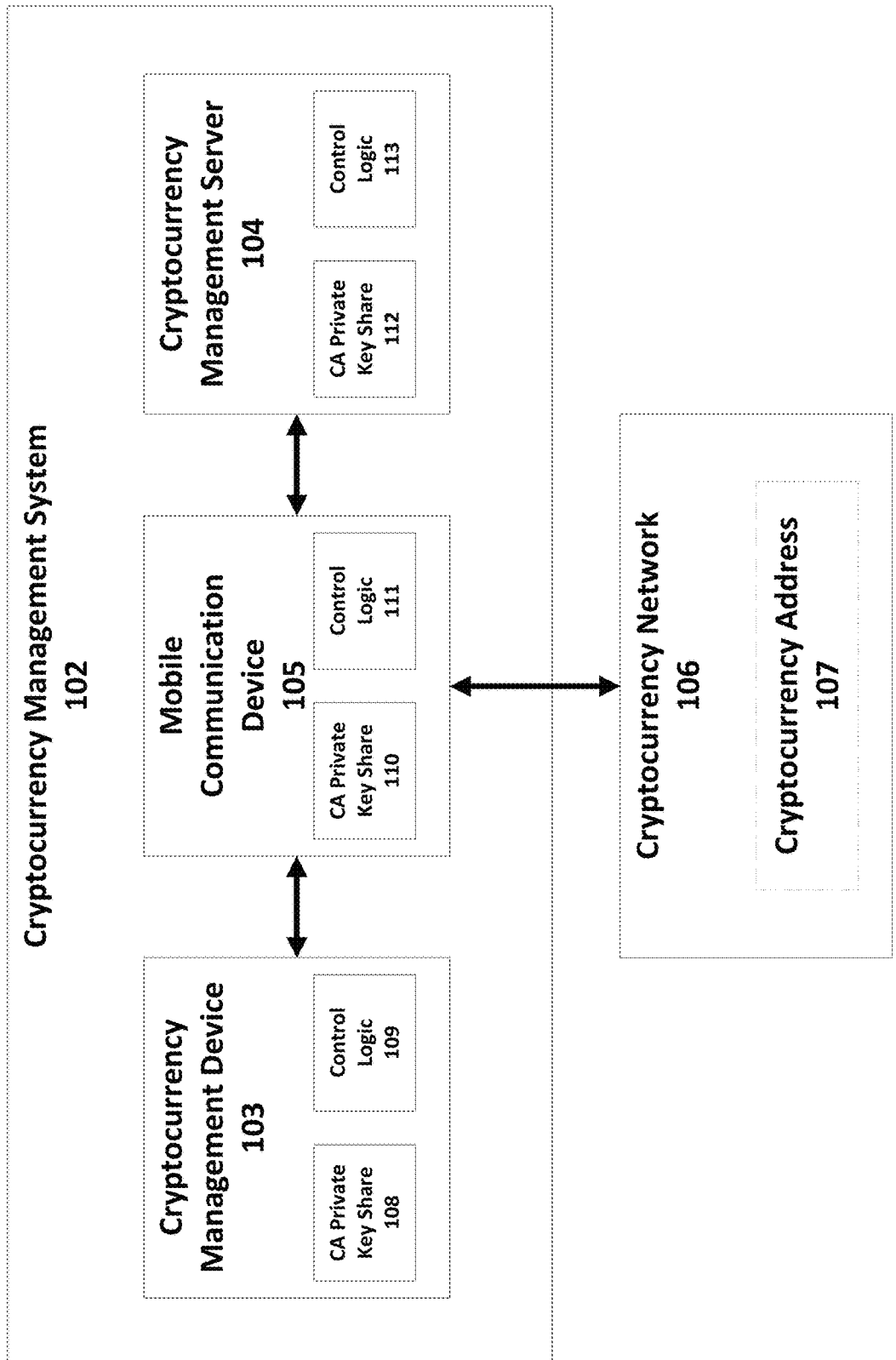
FIG. 1 is a block diagram illustrating a cryptocurrency management system, according to an exemplary embodiment of the present disclosure.

The present disclosure generally pertains to system and methods for managing and using digital financial assets, such as cryptocurrency. In some embodiments of the present disclosure, multiple independent devices mutually cooperate to control cryptocurrency assets in a secure manner. In this regard, each of these devices may store a unique authenticating key share associated with the cryptocurrency assets, and the cryptocurrency assets may be configured such that a certain minimum number of these authenticating key share are required to transfer the cryptocurrency assets. The use of multiple authenticating key shares spread across multiple distinct devices may reduce the likelihood of loss stemming from a hardware failure or reduce the likelihood of an attacker successfully gaining access to the cryptocurrency assets.

In some embodiments, the number and characteristics of these authenticating key share storing devices (e.g., portable vs stationary, user custody vs third-party custody), as well as how many authenticating key shares are required to authorize a transaction, may be tailored to balance a user's preferences for reliability of access versus security and for third-party custody versus self-custody. For example, a user who prioritizes security may require a greater number of authenticating key shares for authorizing a transaction. In contrast, a user prioritizing reliability of access may require a fewer number of authenticating key shares. Over time, the minimum number of authenticating key shares sufficient to authorize a transaction may change in an effort to enable recovery from a failed device or a loss of credentials.

With regards to prioritizing self-custody, a user may opt only to utilize devices to which the user has direct access to (e.g., within the user's possession). In contrast, a user wishing to have at least more flexibility or robustness to device failures may opt to utilize one or more devices of a third party, such as a trusted agent. In addition, over time, the devices or authenticating key shares that may be used to authenticate a transaction may change in an effort to enable recovery from a failed device or a loss of credentials.

The devices used to manage the authenticating key shares may also be configured so as to authenticate themselves to one another in a manner that is easy and convenient to the user. For example, each pair of the devices may have a shared secret (e.g., a shared symmetric key) between themselves that is independent of the authenticating key shares used to authorize the cryptocurrency transactions. This can allow a user to authenticate himself or herself to one of these devices by, e.g., providing a password or other form of verification such as a fingerprint. This device may then authenticate itself to the other devices using the shared secret and the user provided verification in a manner that is transparent to the user. Thus, from the user's perspective, the process of authenticating a transaction involving the transfer of financial assets is simplified. The net effect of these techniques and functions, as described in more detail below, is to reduce the chance that access to the cryptocurrency assets are lost while improving the ease of conducting a transaction using the cryptocurrency funds.

A system in accordance with some embodiments of the present disclosure employs a cryptocurrency management device (CMD), a cryptocurrency management server (CMS), and a mobile communication device (MCD) to jointly store and control the cryptographic keys used to generate valid transactions involving a cryptocurrency address. The cryptocurrency address may be configured to generally require signatures produced by a certain number (e.g., quorum) of these devices, thereby improving the security of the cryptocurrency assets. Moreover, the distribution of authority across these devices reduces the chance of a loss of access to the cryptocurrency assets resulting from a physical loss or failure of a particular device. The manner in which the devices communicate with one another, as well as their ability to implement more advance security directives, also improves the ease and efficiency of a user conducting a transaction using the cryptocurrency funds from the cryptocurrency address.

In some embodiments of the present disclosure, an MCD may be used to physically store digital financial assets. These financial assets may be obtained from an account at a financial service provider and stored as data in a mobile wallet that is linked to that account and that is itself located within the MCD's non-volatile memory. Because these assets are stored on the MCD itself, they may be used to settle financial transactions (e.g., pay for goods being bought from a seller) without needing to communicate with the financial service provider (or any other non-local entity besides the other participant in the financial transaction). Thus, the MCD may settle financial transactions directly with another device (e.g., another MCD), without requiring a concurrent internet connection. Mechanistically, this involves transferring some portion of the locally stored financial assets to a mobile wallet on the other device.

In addition to the ability to conduct financial transactions even in the absence of a concurrent internet connection, the receiving party can also reliably accept the assets as payment without needing to communicate with a financial service provider (or any other non-local entity besides the other participant in the financial transaction) and without requiring exposure of sensitive information from the other participant. In addition, linking the user's account information with the mobile wallet (and with the transferred financial assets) allows the receiving party to avoid potential double-spend attacks.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below.

FIG. 1 is a simplified block diagram of a cryptocurrency management system. As shown by the figure, a cryptocurrency management system 102 may comprise a cryptocurrency management device (CMD) 103, a cryptocurrency management server (CMS) 104, and a mobile communication device (MCD) 105. Also shown by the figure is a cryptocurrency network 203 and a cryptocurrency address 107 associated with (one or more transactions in) the cryptocurrency network 106. In general, the MCD 105 may interact with the CMD 103 and the CMS 104 to, among other things, generate and submit valid cryptocurrency transactions. As part of this process, the MCD 105 may also interact with the cryptocurrency network 203.

In general, each of the devices 103, 104, and 105 may also comprise a cryptocurrency account (CA) private key share (i.e., CA private key shares 108, 110, and 112) and control logic (i.e., control logic 109, 111, and 113). As described further below, the CA private key shares 108, 110, and 112 are cryptographic keys associated with the private key of the public-private key pair (the private key of one of the public-private key pairs, for multi-signature addresses) of a cryptocurrency address (e.g., cryptocurrency address 107). As also described further below, the control logics 109, 111, and 113 may contain instructions that can be executed by their device's respective processor 603 to perform various functions of that device.

At a high level, the cryptocurrency management system 102 works to manage the cryptocurrency address 107 by controlling use of the cryptocurrency funds associated with the cryptocurrency address 107 in a transaction. In this regard, the cryptocurrency management system 102 can be thought of as an association of devices or systems that (1) each have been distributed a portion of the authority to control the cryptocurrency address 107 and (2) are configured to cooperate with one another to use their collective authority to control (e.g., generate and submit a transaction involving) the cryptocurrency address 107. In other words, the ability to manage the cryptocurrency address 107 is split between the CMD 103, the CMS 104, and the MCD 105. In some embodiments, the CMD 103, the CMS 104, and the MCD 105 communicate with one another and agree to a transaction before the signatures for the transaction are obtained and an authenticated transaction is generated and submitted to the cryptocurrency network 203.

Figure 2:
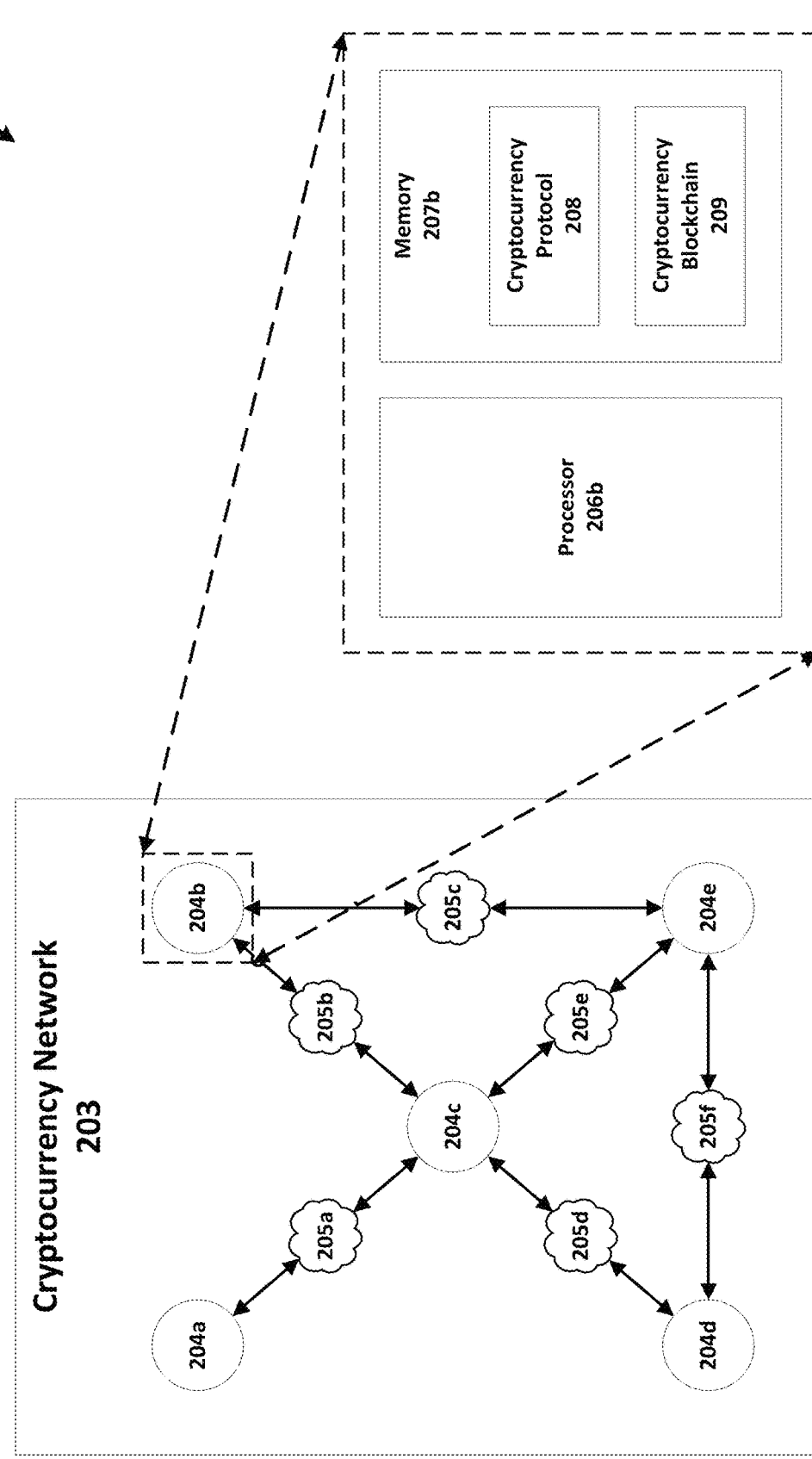
FIG. 2 is a block diagram illustrating a cryptocurrency network, such as is depicted by FIG. 1.

Before explaining the functioning of the cryptocurrency management system 102 in more detail, a basic overview of the terminology and general architecture of cryptocurrencies is useful. FIG. 2 is a simplified schematic giving a basic overview of the general architecture of cryptocurrencies. As shown by the figure, a cryptocurrency architecture 202 comprises a cryptocurrency network 203 that has a plurality of cryptocurrency nodes 204 (shown in FIG. 2 as cryptocurrency nodes 204a, 204b, 204c, 204d, and 204e). In general, the cryptocurrency nodes 204 may communicate with one another over various networks 205 (shown in FIG. 2 as networks 205a, 205b, 205c, 205d, 205e, and 205f), such as the internet.

With regards to their purpose, the cryptocurrency nodes 204 generally work to modify a cryptocurrency blockchain 209 according to the procedures dictated by a cryptocurrency protocol 208. Towards this end, each node is generally associated with one or more processors (shown in FIG. 2 for cryptocurrency node 204b as processor 206b) and a memory unit (shown in FIG. 2 for cryptocurrency node 204b as memory 207b). Stored in each cryptocurrency node's memory is an executable form of the cryptocurrency protocol 208 and a copy of the cryptocurrency blockchain 209. Together, the cryptocurrency network 203, the cryptocurrency protocol 208, and the cryptocurrency blockchain 209 comprise the overall cryptocurrency architecture 202.

More precisely, the cryptocurrency blockchain 209 (also known as a cryptocurrency ledger) is a type of (distributed and decentralized) database where the stored data is a series of records (i.e. transactions) that are grouped into cryptographically linked lists called blocks. These records generally concern amounts of a digital asset, sometimes called "coins" or "tokens", created by the cryptocurrency architectures 202. The cryptocurrency protocol 208 is a set of instructions/rules (e.g., a program) dictating how the cryptocurrency blockchain 209 is processed (e.g., how new transactions are added). Generally speaking, the various cryptocurrency nodes 204 each process the cryptocurrency blockchain 209 according to the cryptocurrency protocol 208.

Because of the lack of a central authority in most cryptocurrency architectures 202, a consideration for the design of the cryptocurrency architectures 202 (i.e., the rules of cryptocurrency protocol 208) is how new blocks and transactions are added to the cryptocurrency blockchain 209. More precisely, the consideration is not just how new blocks and transactions are added to the cryptocurrency blockchain 209, but how the cryptocurrency nodes 204 can come to a consensus on the addition of a new block (and the corresponding transactions within that block).

Broadly speaking, a newly added block to a blockchain contains within itself a list of new transactions and a cryptographic hash of both those new transactions and of the previously added block. This hash may be required to meet certain criteria on which the cryptocurrency nodes 204 generally work to satisfy. This attempt produces a new block by generating a hash satisfying the criteria specified in the cryptocurrency protocol 208. Such a process is often referred to as "mining." The requirements on the hash of a new potential block is the primary mechanism by which the cryptocurrency nodes 204 are able to cooperatively agree on when a new block is added to the blockchain 209.

More precisely, many cryptocurrency architectures 202 are configured (i.e., their cryptocurrency protocol 208 requires) such that a new block is required to meet at least two requirements. First, the transactions within the new block must be valid (i.e., satisfy certain criteria specified by the cryptocurrency protocol 208). Second, the new block must include the hash of the previous block and the transactions within the new block that satisfy certain criteria specified by the cryptocurrency protocol 208. If and when a cryptocurrency node 204 finds such a hash, it transmits the new block to the rest of the cryptocurrency nodes 204 in the cryptocurrency network 203, which validate the new block and, upon confirming its validity, add it to their copy of the cryptocurrency blockchain 209. The cryptocurrency nodes 204 then continue working using the updated cryptocurrency blockchain 209.

Figure 3:
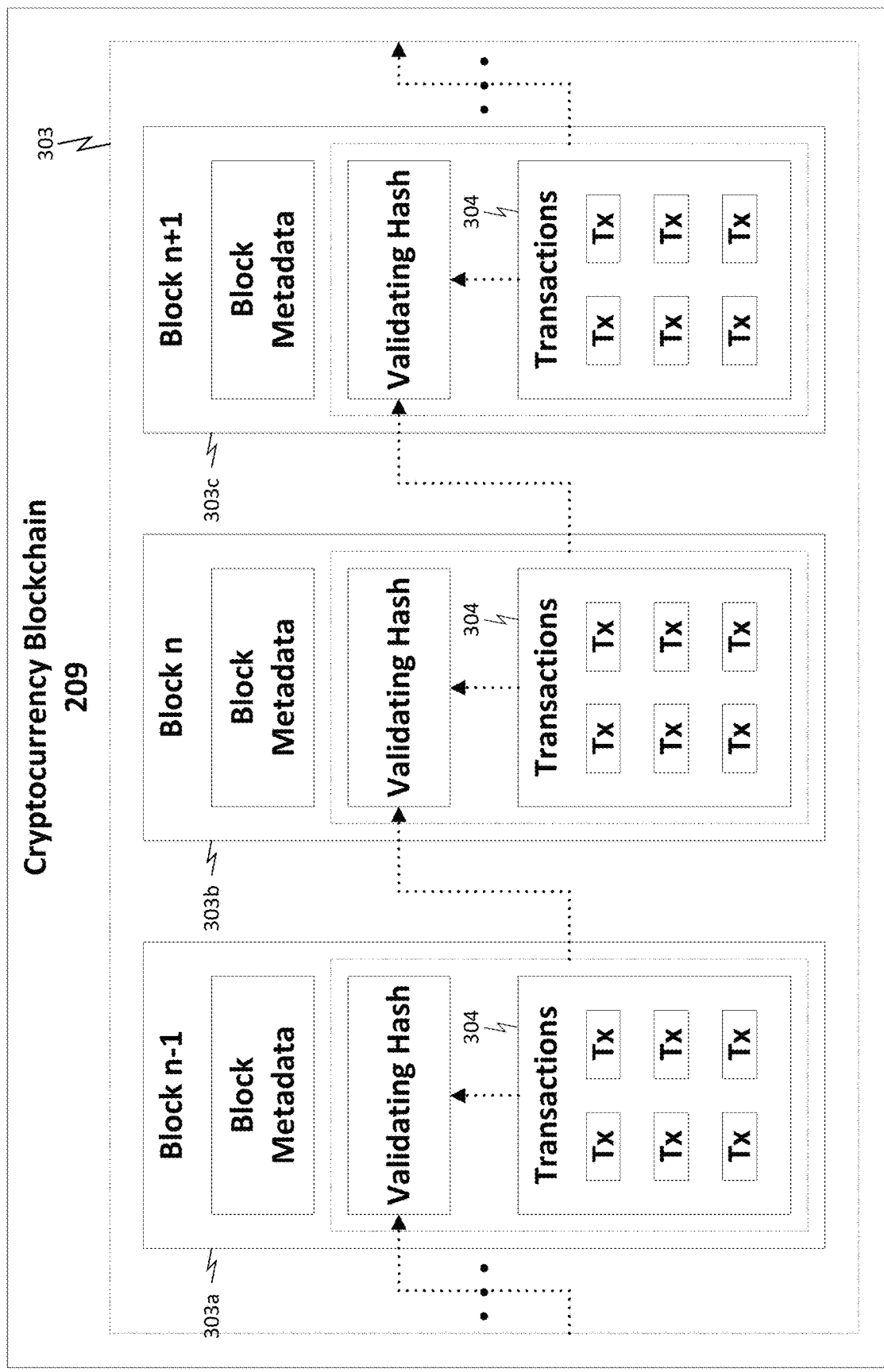
FIG. 3 is a block diagram illustrating a cryptocurrency blockchain, such as is depicted in FIG. 2.

FIG. 3 is a simplified diagram of the structure of the cryptocurrency blockchain 209. As shown by the figure, the cryptocurrency blockchain 209 comprises a plurality of blocks 303 (shown in FIG. 3 as blocks 303a, 303b, and 303c). Each block 303 comprises a series of transactions 304 and a validating hash. The validating hash is a hash of the cryptocurrency transactions 304 and the validating hash of the immediate prior block 303 whose value meets certain criteria defined by the associated cryptocurrency protocol 208.

Figure 4:
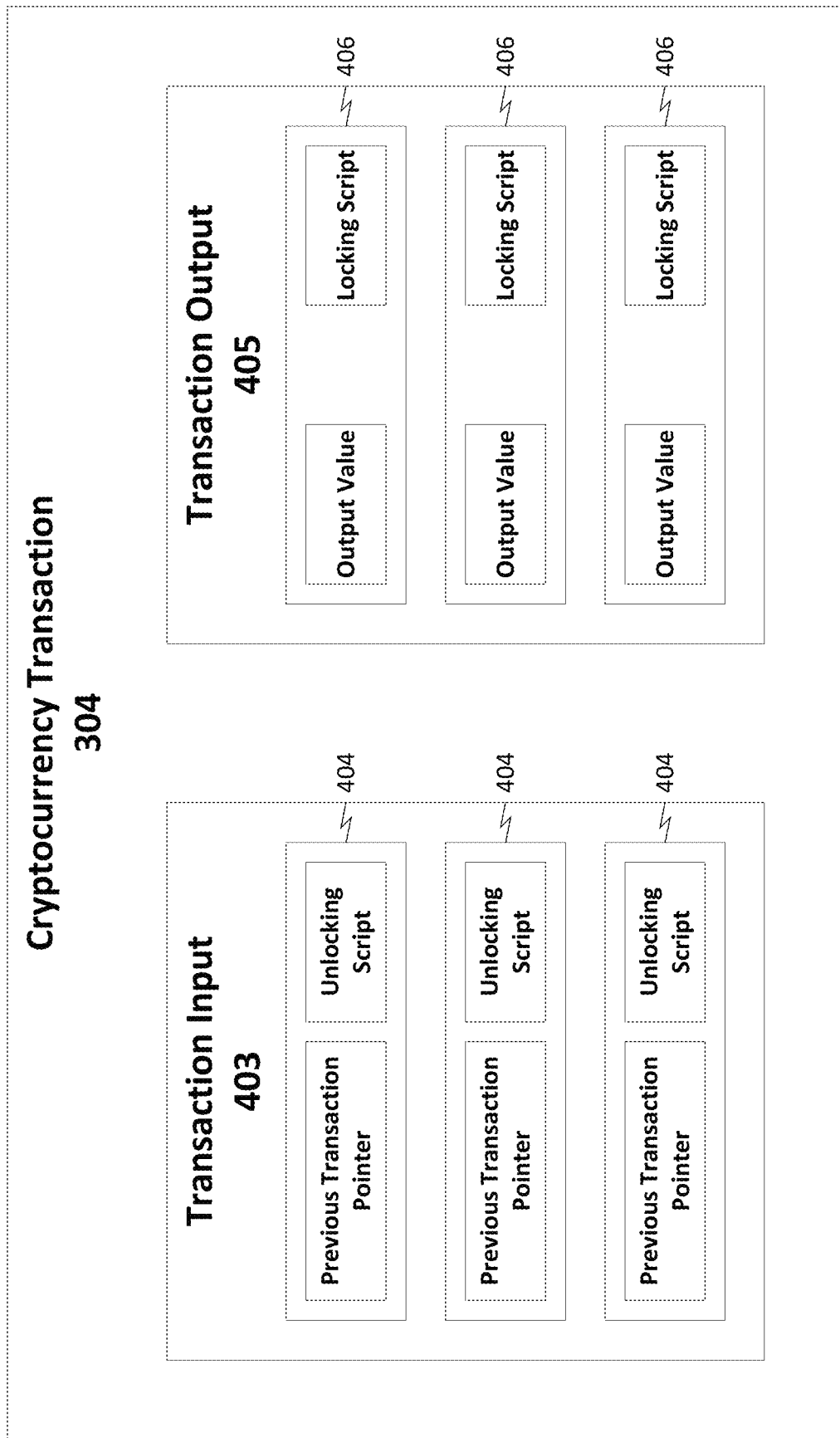
FIG. 4 is a block diagram illustrating a cryptocurrency transaction, such as is depicted in FIG. 3.

It is also useful to note the general structure of the transactions 304. Like many other transactions, at a conceptual level, each transaction 304 involves an input (here of cryptocurrency coins) and an output (here also of cryptocurrency coins) (e.g., as shown in FIG. 4 below). Generally speaking, for a cryptocurrency system, the output is a certain number of cryptocurrency coins and locking conditions (specified in what is known as a locking script (e.g., as shown in FIG. 4 below) that must be satisfied to use those coins as input in a future transaction. The input, then, is the identity of a previous (unspent) transaction and data satisfying its associated locking condition. In this way, every transaction ultimately changes the locking condition of a cryptocurrency coin (or at least a portion of a cryptocurrency coin).

FIG. 4 is a simplified schematic of the structure of a cryptocurrency transaction 304. As shown by the figure, a cryptocurrency transaction 304 includes a transaction input 403 and a transaction output 405. The transaction is the source of cryptocurrency coins for use in the output while the output specifies new locking conditions for those identified cryptocurrency coins. More formally, the transaction input 403 includes one or more input tuples 404. In turn, each input tuple 404 has a previous transaction pointer and an unlocking script. The previous transaction pointer of an input tuple 404 identifies a previous transaction whose output has not yet been spent while the unlocking script satisfies the unlock conditions specified by that previous transaction. Similarly, the transaction output 405 includes one or more output tuples 406. In turn, each output tuple 406 has an output value and a locking script. The output value identifies an amount of cryptocurrency coins while the locking script identifies lock conditions for those cryptocurrency coins to be used in a future transaction.

Thus, a cryptocurrency transaction does not necessarily involve an "account" or "address" and, in general, neither does the overall cryptocurrency architecture 202. Rather, in some embodiments, all that changes is the unlocking condition needed to use a cryptocurrency coin as input to a future transaction. That said, however, many locking scripts (and their associated unlocking scripts) do give rise to something closely analogous to an account or address. Specifically, a common locking script requirement is use of a private key corresponding to a public key listed in the locking script. These locking scripts are often called "pay-to-public-key" (or just "to-public-key") locking scripts. More precisely, the locking script usually lists a public key and requires that a future referencing transaction produce (in its unlocking script) a hash of the new transaction encrypted by the public key's corresponding private key (called a "signature"). Because of the nature of public-private key cryptography, producing an encrypted hash that, when decrypted by the public key, yields the correct hash for the new transaction generally requires possession of the associated private key. Thus, to verify the requirement is met, one first independently generates a hash of the proposed new transaction. One then decrypts the provided signature with the public key listed in the locking script and compares the two hashes. A match means the locking script is satisfied.

The public key specified in a "pay-to-public-key" locking script gives rise to the notion of a cryptocurrency address (or just an "address"). This is broadly because of two reasons. The first is because the holder of the corresponding private key can use (i.e., effectively owns) the cryptocurrency coins from any "pay-to-public-key" locking script using the same public key. This is analogous to how the owner of a financial account can spend any funds in the account. The second reason is that the public key is essentially unique to its corresponding private key. Because of certain mathematical properties of asymmetric cryptography, it is computationally infeasible to generate a public-private key pair with the public key having a specific desired value. Therefore, a given public key has one corresponding private key and, so long as the private key has not been leaked, has a one-to-one correspondence with some controlling entity. This is similarly analogous to an address or account number, which usually uniquely identifies a recipient.

A similar concept known as a "multi-signature address" arises from the use of locking scripts similar to a "pay-to-public-key" locking script with the change of their being multiple public-keys listed. These locking scripts (referred to here as a "pay-to-public-keys" locking script) list several public keys and require the production of a certain number of signatures from corresponding private keys. Thus, the process is essentially the same as with the a "pay-to-public-key" locking script except that multiple private keys are used to make multiple signatures that each must be a match for a listed private key for the locking script condition to be satisfied. The idea of the "multi-signature address" again arises from the combination of the listed public keys or from some derivate derived from them.

Note that, for a "pay-to-public-keys" locking script (i.e., for a multi-signature address), the number of signatures required can be less than the number of listed private keys. For example, a "pay-to-public-keys" locking script may list 7 public keys but specify that production of signatures corresponding to four (or more) of those public keys is sufficient.

As previously mentioned, cryptocurrencies are increasingly being used in various financial transactions. The reasons for this are varied, but are in significant part due to the advantages inherent to cryptocurrencies, such as improved privacy compared to many other digital forms of payment.

However, cryptocurrencies suffer from several disadvantages. In large part, these disadvantages stem from the cryptographic scheme above. Broadly speaking, having the information listed in the unlocking script for given cryptocurrency assets is sufficient to have "control" over those assets. Usually, this is a private key corresponding to the public key listed in the associated locking script. The effect of this, however, is that one should maintain access to the private key and should not allow other untrusted users to access the private key.

Pragmatically, these private keys are long strings of numbers that are effectively too long to be memorized. Consequently, these private keys are often stored on some physical or digital medium that is accessible to the user. However, this introduces a few problems. First, it renders the cryptographic keys vulnerable to being lost or otherwise made inaccessible due to loss or failure of the hardware on which they are stored. Because obtaining cryptographic funds generally requires satisfying the unlocking script associated with those funds, there is usually no way to recover access to a cryptocurrency address if the corresponding private key is lost. In other words, if the locking script requires a digital signature from a private key corresponding to a certain public key, if the private key is lost and no other copies are available, those cryptocurrency funds are essentially permanently lost.

Second, storage of private keys on physical or digital media makes the cryptocurrency assets uniquely vulnerable to theft through digital means. Specifically a malicious party who is able to gain access to the private keys may use such keys to access the cryptocurrency assets associated with the keys.

One solution is to use offline storage, but this makes the system more difficult to use in a transaction. Another method is to store the private key with a third-party. However, this gives up advantage of control over the cryptocurrency assets and requires a user to trust the associated third-party.

In some embodiments of the present disclosure, a cryptocurrency management system 102, such as is depicted by FIG. 1, increases the security of an individual's possession and control over their Bitcoin wallet without overly encumbering ease-of-use or surrendering control over a wallet to a third-party. At a high-level, many of the benefits of the cryptocurrency management system 102 can be attributed to the (differing) natures of the CMD 103, CMS 104, and the MCD 105 and the specifics of how the devices cooperate with one another to manage the cryptocurrency address 107. Because the nature of the devices means that they may have differing advantages and disadvantages (e.g., more or less likely to be lost, more or less in control of a user, etc.), requiring the mutual cooperation of these devices can combine their advantages (and mitigate their disadvantages), resulting in increased reliability and security while maintaining ease-of-use.

The exact trade-off between reliability, security, and ease-of-use may depend on how the devices of the cryptocurrency management system 102 are configured to work together to manage the cryptocurrency address 107. One potentially relevant aspect is if the CMD 103, CMS 104, and the MCD 105 may communicate directly with one another or if one or more the devices may (or possibly must) communicate through an intermediary. If an intermediary is needed for one or more devices, another relevant aspect is the identity of the intermediary, particularly if the intermediary is itself one of the devices of the cryptocurrency management system 102 (e.g., if the intermediary is the CMD 103, CMS 104, or the MCD 105). A related aspect is if the CMD 103, CMS 104, and the MCD 105 jointly participate in carrying out (as opposed to simply, after proper authentication, authorizing) a task (e.g., a transaction involving the cryptocurrency address 107) or if one of the devices acts as a coordinator.

Another potentially relevant aspect is the nature of the communication channels available to the CMD 103, CMS 104, or the MCD 105, such as if the communication channels are short-range only or if they all include long-range communication channels. Also potentially relevant is what is required by each of the CMD 103, CMS 104, or the MCD 105 in order to cooperate with any of the other devices with regards to the cryptocurrency address 107.

Also a potentially relevant aspect is the technical means used to distribute authority over the cryptocurrency address 107. For example, in some embodiments a multi-signature cryptocurrency address may be used, with the authenticating key shares used by the cryptocurrency management system to manage the cryptocurrency address 107 being the address's associated private keys. As another example, in some embodiments a single-signature cryptocurrency address may be used, with the authenticating key shares being "shares" of the private key generated using a threshold secret sharing method to divide information about the private key.

Figure 5:
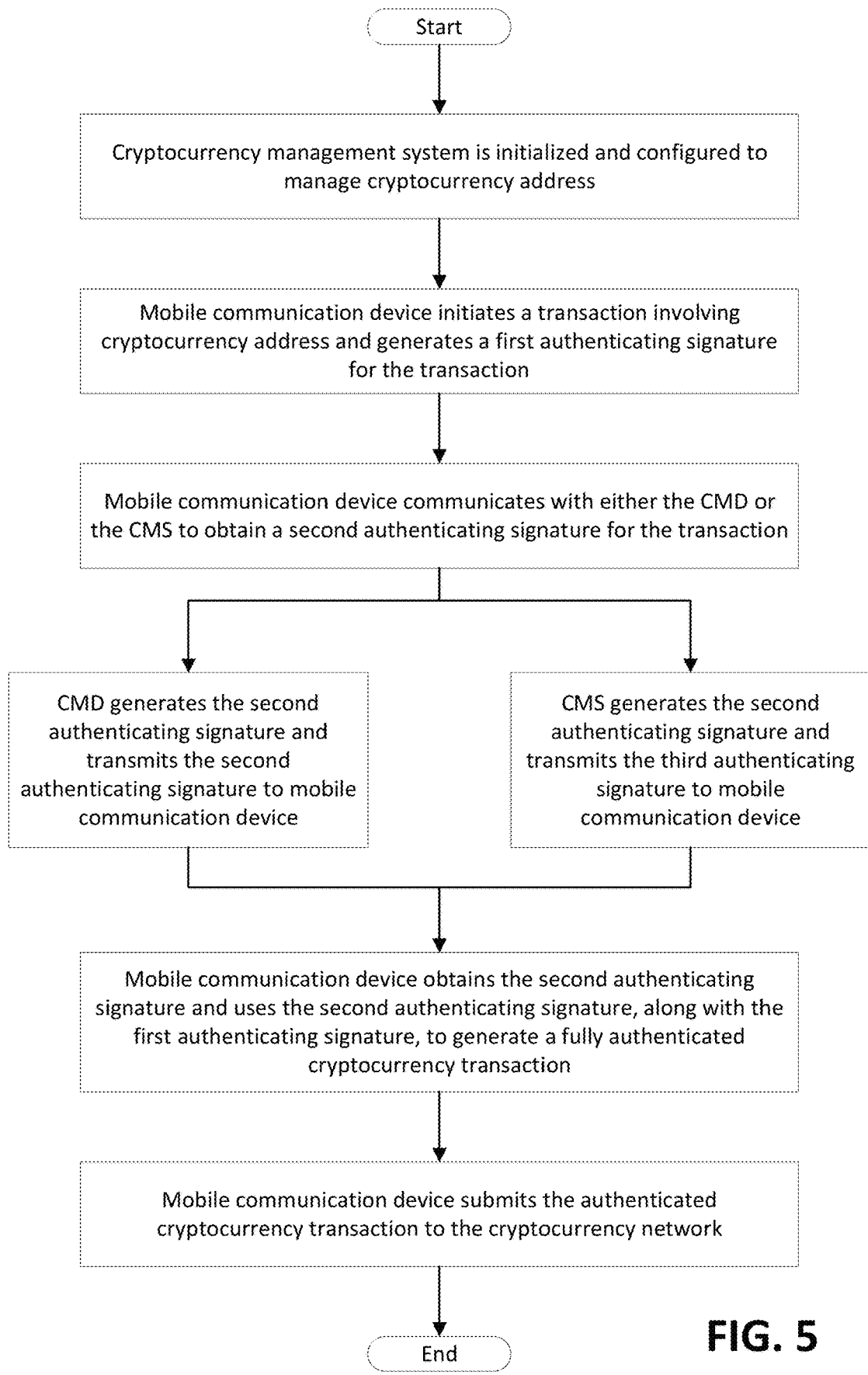
FIG. 5 is a flowchart illustrating an exemplary method of using a cryptocurrency management system, such as is depicted by FIG. 1, to manage cryptocurrency assets.

As a more concrete illustration, FIG. 5 illustrates the operation of a cryptocurrency management system 102 where the MCD 105 is acting as the coordinator and where the cryptocurrency address 107 is a multi-signature address whose private keys are used as the authenticating key shares distributed across the CMD 103, CMS 104, or the MCD 105. More precisely, FIG. 5 is a flowchart of an exemplary method of using a cryptocurrency management system 102 to manage cryptocurrency assets, similar to the description above. Briefly, the process involves configuring the cryptocurrency management system 102 to have sufficient information to manage the cryptocurrency address 107, initiating a financial transaction using the MCD 105, communicating with the CMD 103 or CMS 104 to obtain a second authorizing signature for the transaction, and using the obtained signature, and an authorizing signature generated by the MCD 105, to generate a fully authenticated cryptocurrency transaction. Note that, in other embodiments, other numbers of signatures and/or signatures from different devise may be used authorize a transaction.

As shown by the figure, the process starts with initializing the cryptocurrency management system 102 to manage the cryptocurrency address 107 for cryptocurrency asset. Note here that, as mentioned above, a cryptocurrency address refers to the collection of (unspent) cryptocurrency transactions whose outputs have a "pay-to-public-keys" locking script that references the public keys associated with that cryptocurrency address. Correspondingly, the cryptocurrency address 107 refers to a collection of (unspent) cryptocurrency transactions whose output has a "pay-to-public-keys" locking script that references the public keys associated with cryptocurrency address 107.

After the cryptocurrency management system 102 is initialized, the cryptocurrency management system 102 can be used to effect a transaction involving the cryptocurrency address 107. Specifically, the MCD 105 initiates a transaction involving the cryptocurrency address 107 and generates a first authenticating signature for the transaction. One consideration of this process is how the authority is split between the CMD 103, the CMS 104, and the MCD 105 and how the CMD 103, the CMS 104, and the MCD 105 cooperate with one another to jointly wield this authority. In some embodiments, authority may be split between the components of the cryptocurrency management system 102 by splitting the private keys associated with the cryptocurrency address 107 and giving a respective one of them to the CMD 103, the CMS 104, and the MCD 105. For example, in the simplest case, there are three private keys associated with the cryptocurrency address 107 and each of the CMD 103, the CMS 104, and the MCD 105 is given a respective one of them such that the CMD 103, the CMS 104, and the MCD 105 do not have the same private keys.

Additionally, to generate the authenticating signatures, the CMD 103, CMS 104, and the MCD 105 may employ various digital signature schemes to create a cryptographically secure digital signature of the transaction (or a relevant portion of the transaction) using the devices' respective authenticating key shares. For example, if the transaction involves the Bitcoin network, the CMD 103 may generate the first authenticating signature by using the elliptic curve digital signature algorithm (ECDSA) on each input tuple 404 in the proposed transaction.

After the transaction is initiated, the MCD 105 may work to obtain the information (e.g., the signatures) for authorizing the transaction. To this end, the MCD 105 may communicate with other components of the cryptocurrency management system 102 to obtain their authorization for the initiated transaction. Specifically, the MCD 105 may communicate with either (or possibly both) the CMD 103 and the CMS 104 to obtain a second authenticating signature (and possibly a third authenticating signature) for the transaction. As discussed in more detail below, this may involve the MCD 105 authenticating itself to the device it is communicating with to prove its identity and, possibly, that an authorized user has initiated the transaction. The device that the MCD 105 is authenticating itself to may also provide information to the MCD 105 authenticating the device's identity.

The components of the cryptocurrency management system 102 may employ a variety of techniques to communicate with one another. For example, in the embodiment discussed in FIG. 5, the CMD 103 and the CMS 104 do not communicate directly with one another, but instead communicate only with the MCD 105, which is acting as a coordinator for the financial transaction. In other embodiments, different communication schemes may be used. For example, in some embodiments either the CMD 103 or the CMS 104 may act as the coordinator, with communications from other devices going only to the coordinating device. In other embodiments, the CMD 103, CMS 104, and MCD 105 may directly communicate with one another over the internet.

In addition, the cryptocurrency management system 102 may employ a variety of communication channels to physically transmit information between the CMD 103, CMS 104, and MCD 105, along with any other components of the cryptocurrency management system 102. Additionally, each pair of devices may employ a different communication channel. For example, in some embodiments the CMS 104 and the MCD 105 may communicate with one another over the internet, employing some form of long-range communication to facilitate the communication (e.g., cellular towers, network routers, Wi-Fi hots spots, or other types of access points). On the other hand, in some embodiments the CMD 103 and the MCD 105 may communicate with one another only over short-range, peer-to-peer communication channel (e.g., Bluetooth, Near Field Communication (NFC), or radio frequency identification (RFID)). This may require that the CMD 103 and the MCD 105 be in physical proximity to one another, which may enhance security by increasing the difficulty of a malicious actor somehow compromising the CMD 103. Of course, in some embodiments the CMD 103 and the MCD 105 may communicate at long-range, such as by communicating over the internet.

After receiving the request from the MCD 105, the CMD 103 may (assuming that it accepts the request) generate the requested authenticating signature. Specifically, the CMD 103 may generate the second authenticating signature and then transmit the second authenticating signature to the MCD 105. This may involve generating a signed hash of the transaction proposed in the request from the MCD 10.

Similarly, after receiving the request from the MCD 105, the CMS 104 may (assuming that it accepts the request) generate the requested authenticating signature. Specifically, the CMS 104 may generate the second authenticating signature and then transmit the second authenticating signature to the MCD 105.

Eventually, the MCD 105 may obtain the second and third authenticating signatures from the CMD 103 and the CMS 104. After they are received, the MCD 105 may combine them with the first authenticating signature stored by the MCD 105 to generate a fully authenticated cryptocurrency transaction. Specifically, the MCD 105 may obtain the second and third authenticating signatures and, after they are obtained, use the second and third authenticating signatures, along with the first authenticating signature, to generate a fully authenticated cryptocurrency transaction.

After it is generated, the fully authenticated cryptocurrency transaction can be submitted for processing. Specifically, the MCD 105 may submit the authenticated cryptocurrency transaction request to the cryptocurrency network 203, which then processes the request, thereby finalizing the transaction.

Note that the method described here is performed with the MCD 105 as the initiator of the transaction. However, in general, either of the CMD 103 or the CMS 104 may alternatively initiate the transaction. In such a case, the initiating device or system may perform the same or similar steps described above as performed by the MCD 105.

Also note that, in some embodiments, the MCD 105 may not itself store one of the authenticating key shares and may not itself generate one of the authenticating signatures. Rather, the MCD 105 may perform the function described above of communicating with and obtaining authenticating signatures from other devices of the cryptocurrency management system 102 to obtain a quorum number of authenticating signatures without itself contributing an authenticating signature to that quorum.

Note that in some embodiments the number of authenticating signatures may be conditional and, in particular, may be conditional on the passage of time. For example, in some embodiments the locking script in the most recent transaction involving the cryptocurrency address may specify that, in addition to being satisfied by two signatures produced by any two of the three private keys distributed to the CMD 103, the CMS 104, and the MCD 105, the locking script may also, conditional on the current time being a specified amount of time from the transaction's submission date or after a particular time in the future, be satisfied by only a single signature produced by any one of the three private keys distributed to the CMD 103, the CMS 104, and the MCD 105. This may be useful in preventing loss of access to the cryptocurrency address due to the loss or failure of one of the CMD 103, the CMS 104, or the MCD 105. By automatically reducing the quorum when there is no user-initiated activity (as might be the case when a user could not conduct any activity because of a missing or failed device), this may improve the ability to maintain access to the cryptocurrency address while still maintaining robust security.

To prevent the conditional lower quorum from going into effect, the CMS 104 may monitor how much time has passed since the most recent transaction and may determine if the lower quorum should be allowed to go into effect or not. If the CMS 104 determines that the lower quorum should not be allowed to go into effect, the CMS 104 may initiate a new transaction—transferring the funds from the cryptocurrency address back to itself—resetting the time-based limitation to begin from the new transaction date.

As another example, there could also be a fourth authenticating key share (in addition to the primary three distributed to the CMD 103, the CMS 104, and the MCD 105). In some embodiments the locking script in the most recent transaction involving the cryptocurrency address may specify that, in addition to being satisfied by two signatures produced by any two of the three private keys distributed to the CMD 103, the CMS 104, and the MCD 105, the locking script may also, conditional on the current time being a specified amount of time from the transaction's submission date or after a particular time in the future, be satisfied by any two signatures produced by any two of the fourth authenticating key and the three private keys distributed to the CMD 103, the CMS 104, and the MCD 105. In this case, the fourth private key is essentially inactive until the specified amount of time has passed, after which it automatically becomes active.

The fourth authenticating key share may, in general, be located on a variety of devices of systems. One example is that the fourth authenticating key share is also held by the CMS 104. This may be particularly useful because the CMS 104, as a typically larger distributed network, is less likely to suffer catastrophic failure. By making the fourth authenticating key share conditionally active, this enables a user to gain the reliability of storing the authenticating key shares necessary (e.g., for a quorum of 2) to access the cryptocurrency address 107 with a commercial operator without having to yield immediate control over their cryptocurrency funds to the operator.

Similar to the previous example, to prevent the fourth authenticating key from becoming active, the CMS 104 may monitor how much time has passed since the most recent transaction and may determine if the fourth authenticating key should be allowed to activate or not. If the CMS 104 determines that the fourth authenticating key should not be allowed to activate, the CMS 104 may initiate a new transaction—transferring the funds from the cryptocurrency address back to itself—resetting the time-based limitation to begin from the new transaction date.

One way that the conditional change to the quorum number may be implemented is using time-based condition requirements in the locking script of the transaction. For example, if the cryptocurrency involved is Bitcoin, the CHECKLOCKTIMEVERIFY command may be used to make parts of the locking script conditional on the passage of a certain amount of time. Thus, to implement a change in the quorum condition—say based on a lack of activity for 30 days—the locking script may be structured such that it is satisfied by either the production of a certain number of authenticating hashes (the usual quorum number) or by, after the passage of time specified by CHECKLOCKTIME-VERIFY, the production of one (or other number) less number of authenticating hashes. Whenever activity involving the cryptocurrency address 107 occurs (before the specified passage of time), the cryptocurrency management system 102 may refresh the timer by generating a new transaction with the cryptocurrency funds with the CHECKLOCKTIMEVERIFY changed to be 30 days from the time of the new transaction.

In some embodiments, rather than use a multi-signature cryptocurrency address, a single-signature cryptocurrency address may be used. To generate the authenticating key shares for the single-signature cryptocurrency address that are used to distribute control over the cryptocurrency address, a threshold secret sharing method may be used to divide information about the private key from the sole public-private key pair associated with the cryptocurrency address into a number of authenticating key shares. The nature of the generated authenticating key shares is such that possession of at least a threshold-amount of the key shares is sufficient to fully generate the private-key for the cryptocurrency address while any amount of key shares less than the threshold-amount provides no information about the private key.

For example, one threshold secret-sharing method that may be used to generate the authenticating key shares is flexible round-optimized Schnorr threshold signatures (FROST). At a high-level, the FROST method of key share generation takes place in two rounds. In the first round, each participant (i.e., the devices that will be getting one of the key shares), generate several random coefficients to a degree $m-1$ polynomial, where m is the threshold number of key shares needed to generate an authorizing signature. Each device then generates a commitment vector using these random coefficients and a generator point and uses the coefficient of the first entry as a private key to compute a Schnorr signature of the generated commitment vector. Each device then sends its commitment vector and compute Schnorr signature to every other device.

In the second round, each device generates a sub-share using the values from their commitment vector—one value for each share generated, which is for every participant—and sends a unique sub-share to every other device, keeping one sub-share for itself. Each device can then use the sub-shares they received from every other device (along with the sub-share the device generated and retained for itself) to generate a share key for that device.

Figure 6:
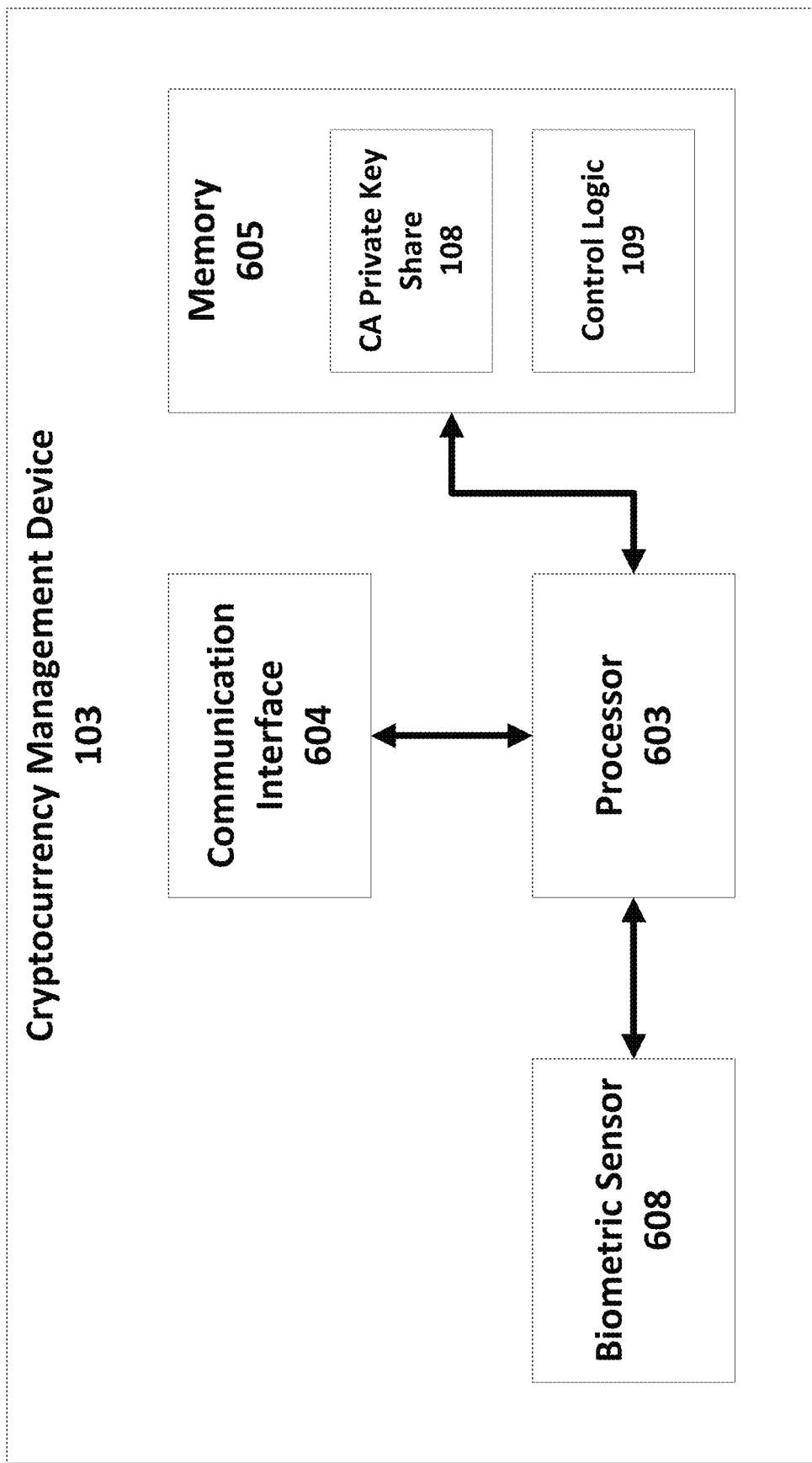
FIG. 6 is a block diagram illustrating a cryptocurrency management device, such as is depicted in FIG. 1.

FIG. 6 is a block diagram of a cryptocurrency management device (CMD) 103, such as the CMD of FIG. 1. As shown by the figure, a cryptocurrency management device (CMD) 103 may comprise at least one processor 603 that is connected to a communication interface 604 and a memory 605. In general, the processor 603 may interact and control these components, as well as other components of the CMD 103, to orchestrate the functioning of the device. The communication interface 604 may comprise circuitry that is configured to communicate with other devices over various communication channels.

For example, in some embodiments the communication interface 604 may allow communications over only a short-range, peer-to-peer communication channel (e.g., Bluetooth, Near Field Communication (NFC), or radio frequency identification (RFID)). Alternatively, in some embodiments the communication interface 604 may only networks such as the internet. As an example, the communication interface 604 may comprise modems, wireless radios (e.g., cellular transceivers), or other devices that are designed to wirelessly communicate with other devices or with network access points, such as cellular towers, network routers, Wi-Fi hots spots, or other types of access points. In general and as is relevant here, the communication interface 604 may be used to communicate with components of the cryptocurrency management system 102—such as the CMS 104 and the MCD 105—as well as with (particular nodes of) the cryptocurrency network 203.

The memory 605 is connected to and editable by the processor 603. The memory 605 may store, among other things, a cryptocurrency account (CA) private key share 108 and control logic 109. As described further below, the CA private key share 108 is a cryptographic key associated with the private key of the public-private key pair (the private key of one of the public-private key pairs, for multi-signature addresses) of a cryptocurrency address (e.g., cryptocurrency address 107). As also described further below, the control logic 109 may contain instructions that can be executed by the processor 603 to perform various functions of the CMD 103 described herein, including the initiation of or processing for a transaction involving the cryptocurrency address 107.

In operation, the processor 603 may execute the instructions of the control logic 109 to manage the cryptocurrency assets associated with the cryptocurrency address 107. This may involve communicating with the CMS 104 and the MCD 105 to obtain (or produce) authorizing signatures as well as communicating with (nodes of) the cryptocurrency network 203. To obtain signatures from the CMS 104 or the MCD 105, the processor 603 may interact with the communication interface 604 to communicate with the CMS 104 and the MCD 105.

Note that the control logic 109 can be implemented in software, hardware, firmware or any combination thereof. In the exemplary CMD 103 illustrated by FIG. 6, the control logic 109 is implemented in software and stored in the memory 605. When implemented in software, the control logic 109 can be stored and transported on any computer-readable medium for use by or in connection with an instruction execution apparatus that can fetch and execute instructions, such as the processor 603. In the context of this document, a "computer-readable medium" can be any means that can contain or store a computer program for use by or in connection with an instruction execution apparatus.

In some embodiments the CMD 103 may have a biometric sensor 608 for authenticating an authorized user. For example, in some embodiments the biometric sensor 608 is a fingerprint sensor located on a surface of the CMD 103, but other types of biometric sensors 608 are possible in other examples. Other embodiments may not have a biometric sensor.

Note that, in some embodiments the CMD 103 may not have access the internet or some other form of wireless network. Rather, in some embodiments the CMD 103 may communicate only via short-range communication channels, requiring any devices seeking to interact with the CMD 103, such as the MCD 105, to be brought into close physical proximity (e.g., within several feet) to the CMD 103. Limiting the range of the CMD 103 helps to enhance security by preventing at least some attempts by unauthorized user to access the data stored in the CMD 103. Indeed, the CMD 103 may be kept for extended times in a secure location inaccessible to many hackers. When communication with the CMD 103 is desired, such as for authorization of a transaction involving the cryptocurrency managed by the CMD 103, the MCD 105 may be taken to the CMD 103.

In some embodiments, the CMD 103 may have a small, tag-like form factor that, among other things, allows the CMD 103 to be easily portable. When the CMD 103 is portable, it may be taken to a location associated with a transaction, such a location of a sale of product or service to be purchased by the cryptocurrency so that it is unnecessary to bring the MCD 105 to the secure location (e.g., home of the user) where the CMD 103 is normally kept. In other embodiments, the CMD 103 may have a larger, less portable form factor.

Figure 7:
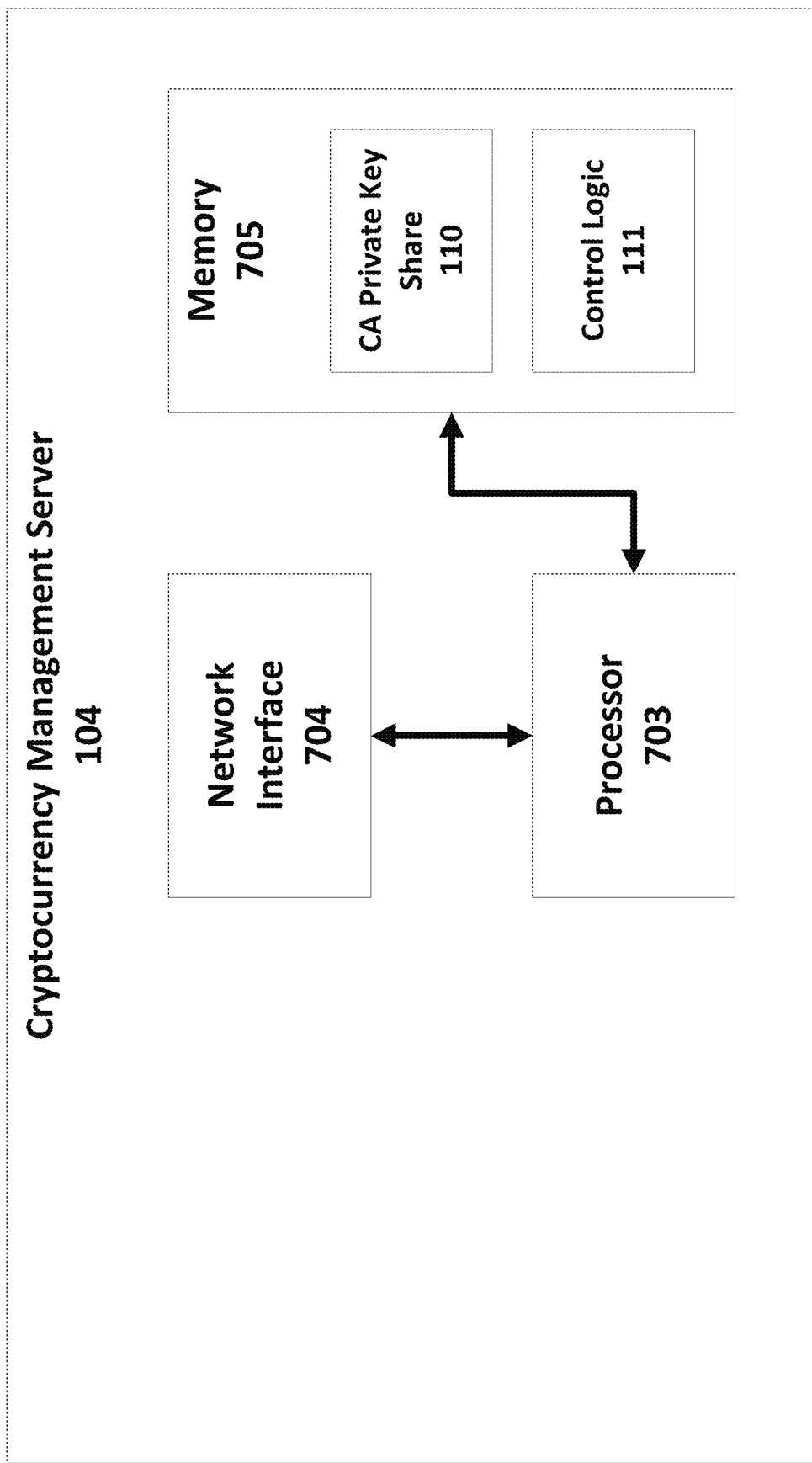
FIG. 7 is a block diagram illustrating a cryptocurrency management server, such as is depicted in FIG. 1.

FIG. 7 is a block diagram of a cryptocurrency management server (CMS) 104, such as the CMS of FIG. 1. As shown by the figure, a cryptocurrency management server (CMS) 104 may comprise at least one processor 703 that is connected to a network interface 704 and a memory 705. In general, the processor 703 may interact and control these components, as well as other components of the CMS 104, to orchestrate the functioning of the device. The network interface 704 may comprise circuitry configured to communicate with other devices over various networks, such as the internet. As an example, the network interface 704 may comprise modems, wireless radios (e.g., cellular transceivers), or other devices that are designed to communicate with network access points, such as cellular towers, network routers, Wi-Fi hots spots, or other types of access points. In general and as is relevant here, the network interface 704 may be used to communicate with components of the cryptocurrency management system 102—such as the CMD 103 and the MCD 105—as well as with (particular nodes of) the cryptocurrency network 203).

The memory 705 is connected to and editable by the processor 703. The memory 705 may store, among other things, a cryptocurrency account (CA) private key share 110 and control logic 111. As described further below, the CA private key share 110 is a cryptographic key associated with the private key of the public-private key pair (the private key of one of the public-private key pairs, for multi-signature addresses) of a cryptocurrency address (e.g., cryptocurrency address 107). As also described further below, the control logic 111 may contain instructions that can be executed by the processor 703 to perform various functions of the CMS 104 described herein, including the initiation of or processing for a transaction involving the cryptocurrency address 107.

In operation, the processor 703 may execute the instructions of the control logic 111 to manage the cryptocurrency assets associated with the cryptocurrency address 107. This may involve communicating with the CMD 103 and the MCD 105 to obtain (or produce) authorizing signatures as well as communicating with (nodes of) the cryptocurrency network 203. To obtain signatures from the CMD 103 or the MCD 105, the processor 703 may interact with the network interface 704 to communicate with the CMD 103 and the MCD 105.

Note that the control logic 111 can be implemented in software, hardware, firmware or any combination thereof. In the exemplary CMS 104 illustrated by FIG. 7, the control logic 111 is implemented in software and stored in the memory 705. When implemented in software, the control logic 111 can be stored and transported on any computer-readable medium for use by or in connection with an instruction execution apparatus that can fetch and execute instructions, such as the processor 703.

Figure 8:
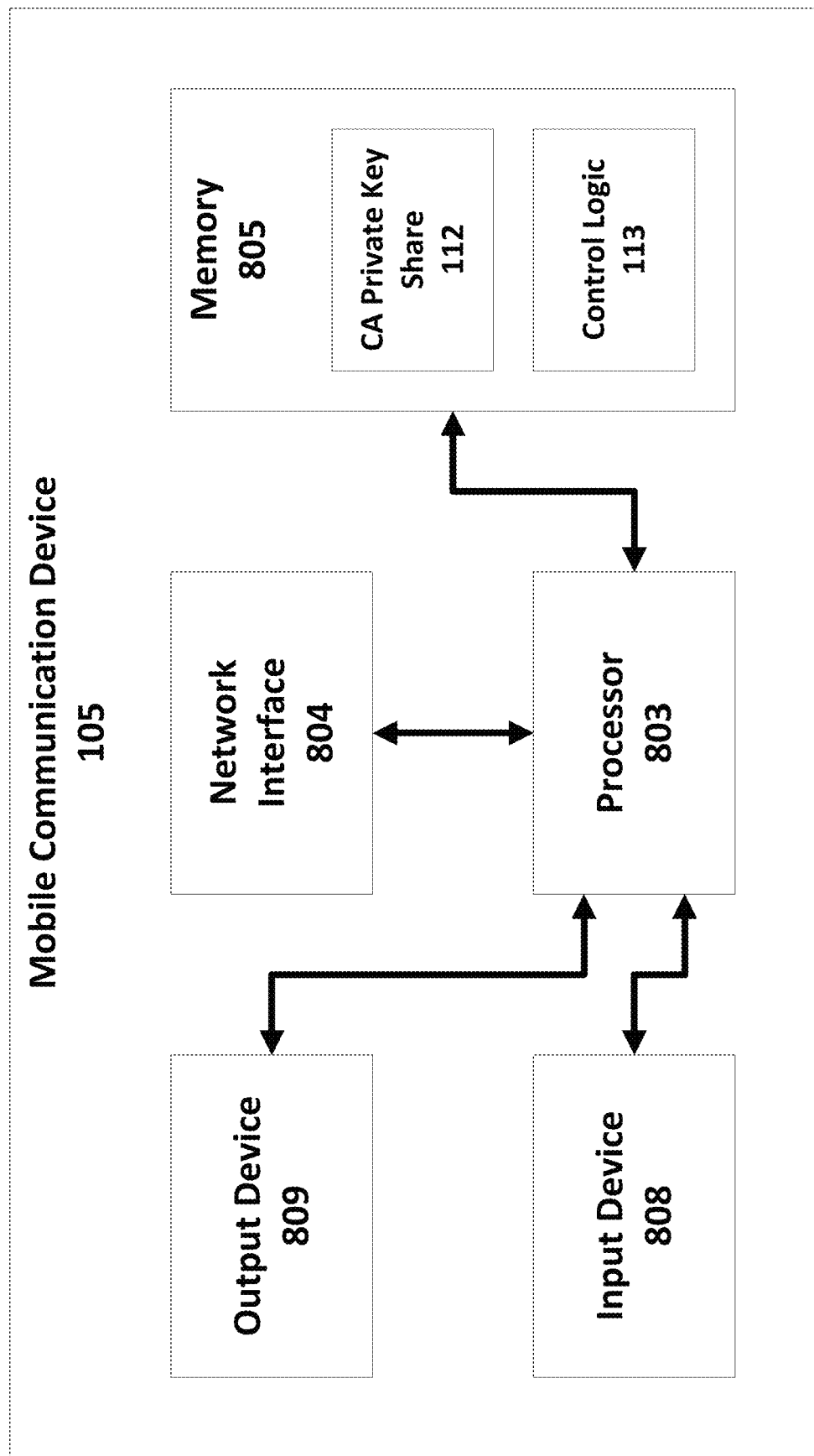
FIG. 8 is a block diagram illustrating a mobile communication device, such as is depicted in FIG. 1.

FIG. 8 is a block diagram of a MCD 105, such as the MCD 105 of FIG. 1. The MCD 105 may be implemented as a smartphone, but other types of MCDs 105 are possible, such as a laptop or smart tag (e.g., a wearable device) for example.

As shown by the figure, an MCD 105 may comprise at least one processor 803 that is connected to a network interface 804, and a memory 805. In general, the processor 803 may interact and control these components, as well as other components of the MCD 105, to orchestrate the functioning of the device. The network interface 804 may comprise circuitry configured to communicate with other devices over various networks, such as the internet. As an example, the network interface 804 may comprise modems, wireless radios (e.g., cellular transceivers), or other devices that are designed to communicate with network access points, such as cellular towers, network routers, Wi-Fi hots spots, or other types of access points. In general and as is relevant here, the network interface 804 may be used to communicate with components of the cryptocurrency management system 102—such as the CMD 103 and the CMS 104—as well as with (particular nodes of) the cryptocurrency network 203). Any of the components of the cryptocurrency management system 102, including the MCD 104, may include other types interfaces, such as a short-range communication interface as described below with reference to the MCD 1402 depicted by FIG. 14B.

The memory 805 is connected to and editable by the processor 803. The memory 805 may store, among other things, a cryptocurrency account (CA) private key share 112 and control logic 113. As described further below, the CA private key share 112 is a cryptographic key associated with the private key of the public-private key pair (the private key of one of the public-private key pairs, for multi-signature addresses) of a cryptocurrency address (e.g., cryptocurrency address 107). As also described further below, the control logic 113 may contain instructions that can be executed by the processor 803 to perform various functions of the MCD 105 described herein, including the initiation of or processing for a transaction involving the cryptocurrency address 107.

In operation, the processor 803 may execute the instructions of the control logic 113 to manage the cryptocurrency assets associated with the cryptocurrency address 107. This may involve communicating with the CMD 103 and CMS 104 to obtain (or produce) authorizing signatures as well as communicating with (nodes of) the cryptocurrency network 203. To obtain signatures from the CMD 103 or CMS 104, the processor 803 may interact with the network interface 804 to communicate with the CMD 103 and CMS 104.

Note that the control logic 113 can be implemented in software, hardware, firmware or any combination thereof. In the exemplary MCD 105 illustrated by FIG. 8, the control logic 113 is implemented in software and stored in the memory 805. When implemented in software, the control logic 113 can be stored and transported on any computer-readable medium for use by or in connection with an instruction execution apparatus that can fetch and execute instructions, such as the processor 803.

Relatedly, in some embodiments the control logic 113 may be part of a software application running on the MCD 105. For example, the control logic 113 may be part of a software application ("app") of a financial service provider.

In some embodiments, the MCD 105 may also comprise an input device 808 and an output device 809. Generally speaking, the output device 803 is configured to communicate information to a user through some mechanism, such as a digital display. The processor 803 may interact with the output device 803 to transmit data to the user. Conversely, the input device 808 is configured to receive input from the user of the MCD 105. For example, the input device 808 may be a touch screen that is capable of receiving user input in the form of taps, gestures, and other physical interactions with the screen. As indicated by this example, the input device 808 and the output device 809 may, in some embodiments, comprise the same device (e.g., a touchscreen display). Additionally, in some embodiments, either or both of the input device 808 and the output device 809 may comprise more than one physical device.

Figure 9:
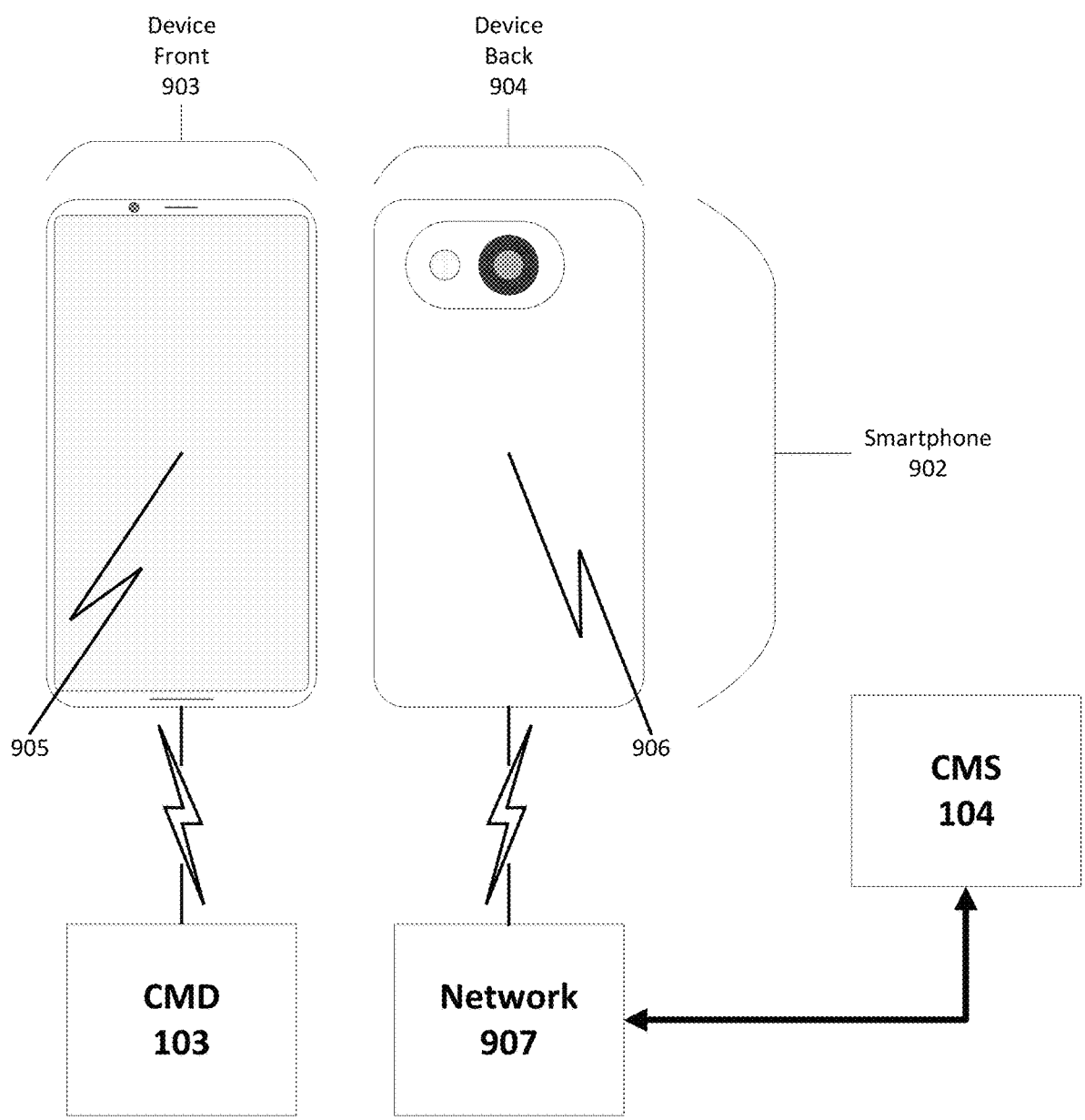
FIG. 9 is a diagram illustrating a front view and back view of an exemplary mobile communication device, such as is depicted in FIG. 8.

FIG. 9 is an illustration of an exemplary MCD having a digital screen as just described. Specifically, the MCD 902 of FIG. 9 (also referred to as the smartphone 902) is implemented as a smartphone having a touch screen 905 on one side of the device (i.e., device front 903) and a camera 906 on the opposite side (i.e., device back 904). The touch screen 905 covers much of the device's front side 903 and implements both the input device 808 and the output device 809 of FIG. 8. The touch screen 905 is capable of giving output by displaying images and video. The touch screen 905 is also capable of receiving user input in the form of taps, gestures, and other physical interactions with the screen. Not shown are the processor and memory internal to the MCD 902 but which function similarly to the processor 803 and the memory 805 of FIG. 8.

As also shown by the figure, the MCD 902 may wirelessly communicate with various devices and access points. In particular, the MCD 902 may communicate directly (and wirelessly) with the CMD 103 using a short-range communication protocol, such as Bluetooth or NFC. The MCD 902 may also communicate indirectly with the CMS 104 through a network 907. The MCD 902 may communicate with the network 907 through various communication protocols, such as a wireless broadband technology like long-term evolution (LTE) or a wireless network protocol like Wi-Fi. The network 907 may comprise multiple networks, including the internet and the internal network of various mobile providers.

Figure 10:
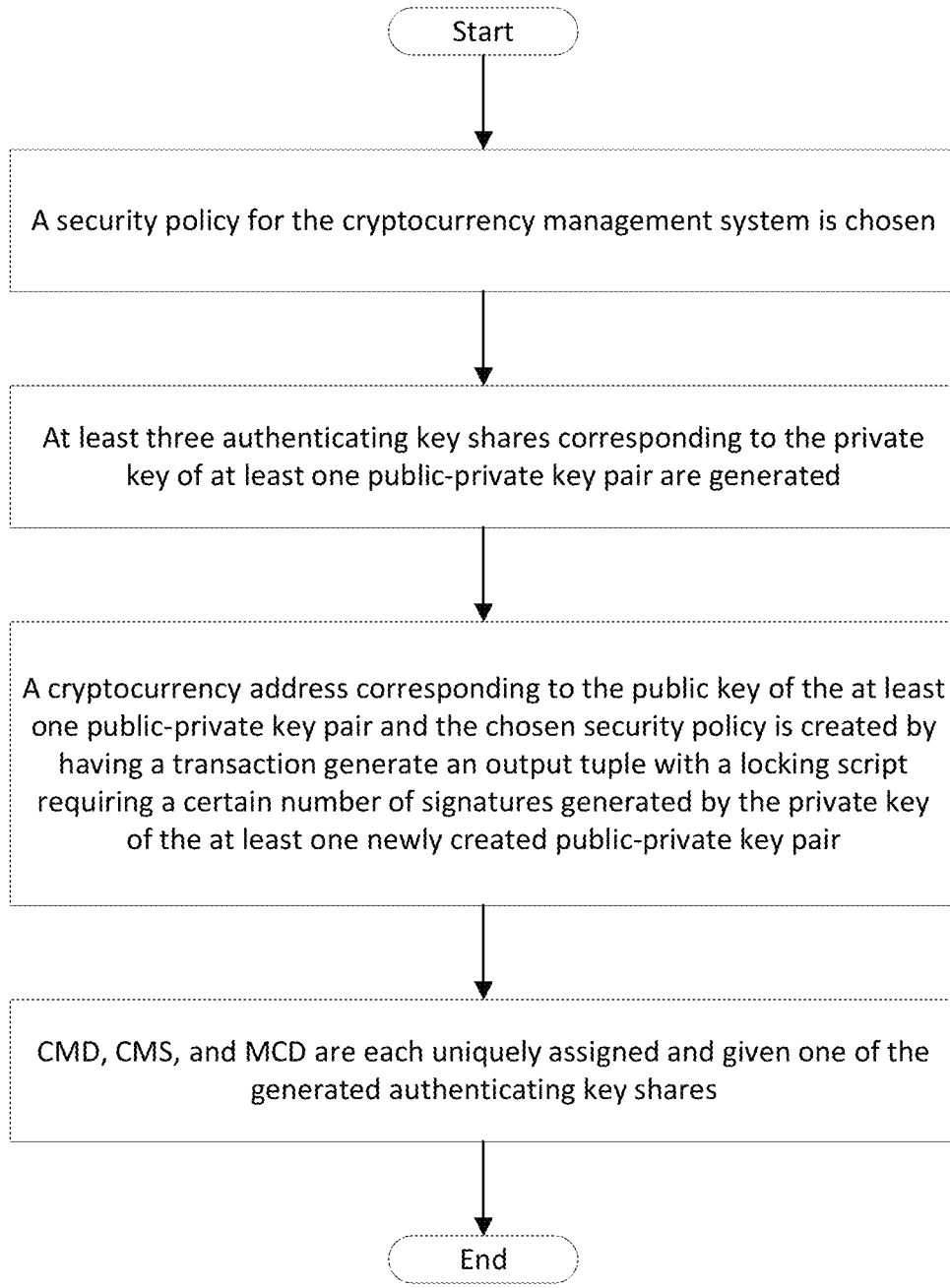
FIG. 10 is a flowchart illustrating an exemplary method of configuring a cryptocurrency management system to begin managing cryptocurrency assets.

FIG. 10 is a flowchart of an exemplary method of configuring a cryptocurrency management system 102 to begin managing cryptocurrency assets, such as previously described in the first step of FIG. 5. To start, as shown by the figure, a security policy for the cryptocurrency management system 102 is chosen. Typically, though not necessarily, the security policy is set by a user to conform to the user's desired balance between security, reliability, and control. In particular, the user may determine what devices will be given an authenticating key share for the cryptocurrency address 107 and how many authenticating signatures may be required to approve a transaction. The cryptocurrency management system 102 may default to (and may even require) that CMD 103, CMS 104, and the MCD 105 be given authenticating key share. The cryptocurrency management system 102 may also default to having any two signatures generated by (different) authenticating key share be sufficient to authorize a transaction.

How the devices of the cryptocurrency management system 102 carry out this process may vary. In some embodiments, the configuration of the security policy by the user may be carried out on the MCD 105. In some embodiments, the configuration may be carried out through the CMS 104, such as by a user interacting with the CMS 104 through an online portal.

After the security policy is established, as shown by the next step of FIG. 10, the cryptographic keys used to control the cryptocurrency address 107 (i.e., the authenticating key shares) may be generated. For a security policy involving the CMD 103, CMS 104, and the MCD 105, as has been the case in previous examples, at least three authenticating key shares are generated. In general, the authenticating key shares are associated with (i.e., may be used in some manner to derive) the private key of the public-private key pair (or the private keys of the public private key pairs, for multi-signature addresses) that defines a cryptocurrency address.

Like in the previous step, how the devices of the cryptocurrency management system 102 carry out generating and distributing the authenticating key shares may vary. In some embodiments, the process may be handled by one centrally coordinating device (e.g., by the device the user specified the security policy on). In other words, in some embodiments the MCD 105 may generate the authenticating key shares and distribute one of these key shares to each of the CMD 103 and the CMS 104. In other embodiments, the CMS 104 may generate the authenticating key shares and distribute one of these key shares to each of the CMS 104 and the MCD 105. In yet other embodiments, the CMD 103, CMS 104, and the MCD 105 may mutually cooperate to generate the authenticating key shares. A benefit of this latter approach is that it can be performed in a way that does not allow any device to obtain or otherwise have access to any authenticating key shares other than the one it generates for itself.

Next, a cryptocurrency address corresponding to the public key of the public-private key pair used to generate the authenticating key shares and the chosen security policy is created by having a transaction generate an output tuple with a locking script requiring a certain number of signatures generated using authenticating key shares. Like with the previous two steps, which device actually generates and submits the initial cryptocurrency address creating transaction to the cryptocurrency network may vary. In some embodiments, the MCD 105 may submit the initial transaction to the cryptocurrency network. In other embodiments, the CMS 104 may submit the initial transaction.

Figure 11:
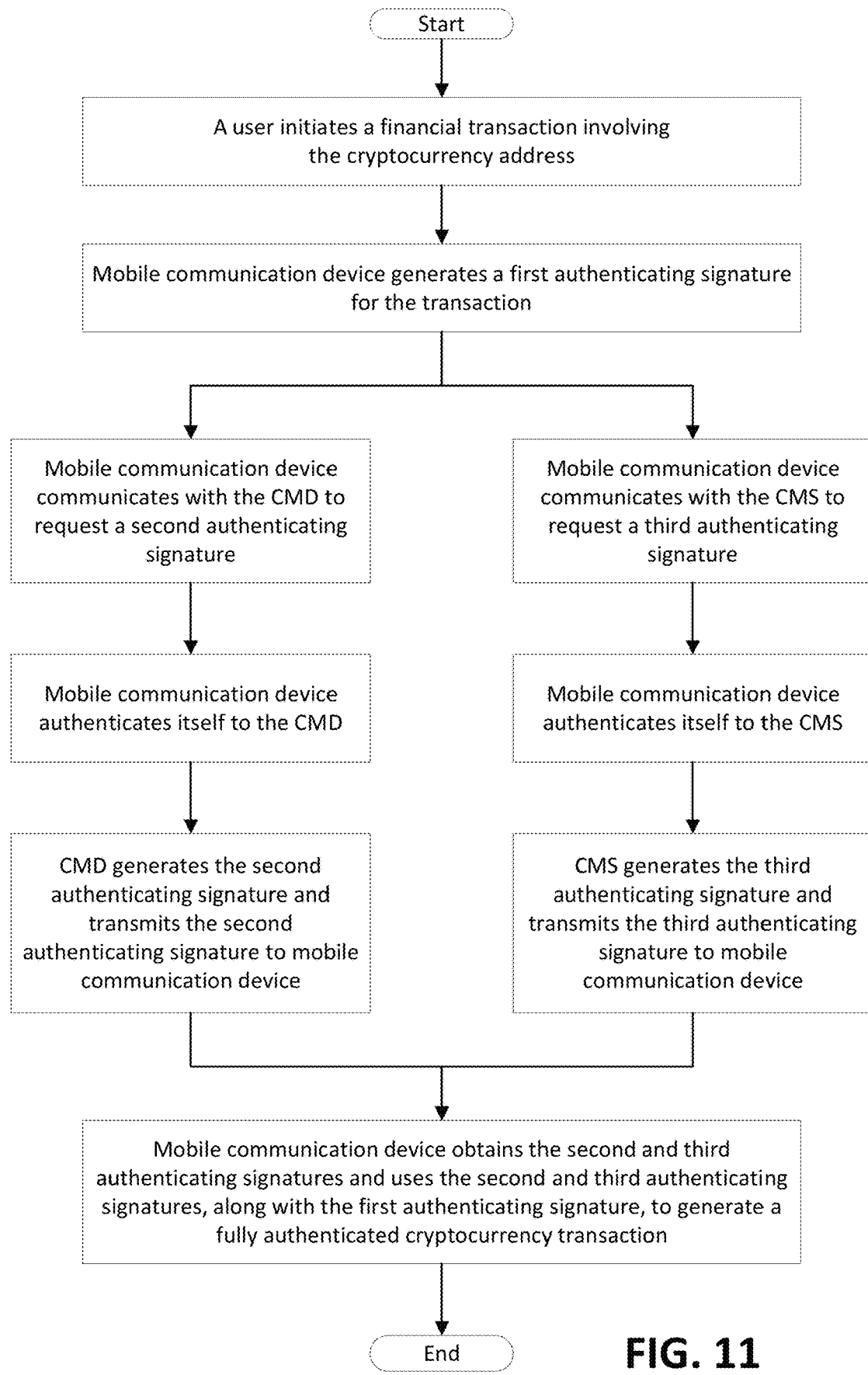
FIG. 11 is a flowchart illustrating an exemplary method of initiating and authenticating a cryptocurrency transaction.

FIG. 11 is a flowchart of an exemplary method of a cryptocurrency management system 102 initiating and authenticating a cryptocurrency transaction. To start, a user initiates a financial transaction involving the cryptocurrency address 107. As an example, the financial transaction may be initiated via a mobile wallet application executing on the MCD 105. In particular initiating the financial transaction may involve a user opening the mobile wallet application and entering details about a transaction, such as the amount to be transferred. The user may then provide some form of authentication such as a password or fingerprint, to authenticate approve the entered transaction. If the MCD 105 accepts the user's provided authentication, it may initiate the transaction.

After the financial transaction is initiated, the MCD may then begin the process of authenticating the transaction. To this end, the MCD 105 generates a first authenticating signature for the transaction. The MCD 105 may also work to obtain the remaining information (e.g., the signatures) needed to authorize the transaction from the other components of the cryptocurrency management system 102. Specifically, the MCD 105 may communicate with either the CMD 103 or the CMS 104 to obtain a second authenticating signature for the transaction.

In some embodiments, the MCD 105 may preferentially select the CMS 104 as the source of the second authenticating signature. The rationale for this preference is that the CMS 104 is likely to be simpler and more readily available than the CMD 103. This may be especially true for embodiments where access to the CMD 103—or at least access to the CMD's ability to generate the second authenticating signature—is limited to share-range communications.

If the MCD 105 is communicating the CMD 103 to obtain the second authenticating signature, the MCD 105 may first initiate communications with the CMD 103. After initiating communications with the CMD 103, the MCD 105 may provide information to the CMD 103 indicating the transaction is authorized. More precisely, the MCD 105 may provide information authenticating the identity of the MCD 105 to the CMD 103. The MCD 105 may also provide the proposed transaction, which may be used by the CMD 103 to generate the second authenticating signature.

After receiving the request and validating information from the MCD 105, the CMD 103 may evaluate the information to confirm the identity of the MCD 105. For example, the CMD 103 and the MCD 105 may each have a public-private key pair used for identification and may have each previously (securely) communicated the public key from the public-private key pair to each other. The MCD 105 may sign its message with its private key, allowing the CMD 103 to determine—using the previously transferred public key from the MCD 105—that the message originates from the MCD 105.

If the CMD 103 successfully authenticates the MCD 105, the CMD 103 may then determine whether to accept the request from the MCD 105 and generate the requested authenticating signature. If the CMD 103 accepts the request, the CMD 103 may generate the requested second authenticating signature and transmit the second authenticating signature to the MCD 105.

A variety of factors may affect whether the CMD 103 accepts the request from the MCD 105. For instance, if the CMS 104 fails to successfully authenticate the MCD 105, it may deny the request. As another example, the CMD 103 may require that the request (and subsequent transfer of a second authenticating signature) be conducted only over a short-range communication channel. The CMD 103 may also require that a user provide their fingerprint to the CMD 103 for a transaction to be approved.

In the event the CMD 103 rejects the request, the CMD 103 may respond in a variety of ways, depending on the reasons for the rejection. For example, the CMD 103 may communicate with the MCD 105 to indicate the reason the request was rejected. In particular, the CMD 103 may indicate to the MCD 105 if the CMD 103 was unable to authenticate the MCD 105 or may indicate that the authentication was successful but one or more of the CMD's requirements to authorize a transaction was not met (e.g., that the user did not supply a correct fingerprint with the required timeframe).

In response to a request rejection, the MCD 105 may take several actions, also possibly depending on the reason for the rejection. For example, if the MCD 105 determines that the reason for the rejection can be remedied, it may perform the correction and send a new request to the CMD 103. As an example of such a correction, if the CMD 103 indicates that the request was rejected because the user did not supply his or her fingerprint in time, the MCD 105 may prompt the user to provide his or her fingerprint to the CMD 103 and, upon receiving acknowledgement from the user, send a new request for the second authenticating signature to the CMD 103.

If the MCD 104 is unable to remedy the reason for rejection—either because of the reason for the rejection or because too many retried requests have been sequentially rejected—the MCD 105 may indicate to the user that authenticating the transaction has failed. This indication may also include information about the reason for the failure. Additionally, the MCD 105 may also, if it has not done so already, attempt to obtain the second authenticating signature from the CMS 104.

Alternatively, if the MCD 105 is communicating with the CMS 104 to obtain the second authenticating signature, the MCD 105 may first initiate communications with the CMS 104. After initiating communications with the CMS 104, the MCD 105 may provide information to the CMS 104 indicating the transaction is authorized. More precisely, the MCD 105 may provide information authenticating the identity of the MCD 105 to the CMS 104. The MCD 105 may also provide the proposed transaction, which may be used by the CMS 104 to generate the second authenticating signature.

After receiving the request and validating information from the MCD 105, the CMS 104 may evaluate the information to confirm the identity of the MCD 105. For example, the CMS 104 and the MCD 105 may each have a public-private key pair used for identification and may have each previously (securely) communicated the public key from the public-private key pair to each other. The MCD 105 may sign its message with its private key, allowing the CMS 104 to determine—using the previously transferred public key from the MCD 105—that the message originates from the MCD 105.

If the CMD 103 successfully authenticates the MCD 105, the CMD 103 may then determine whether to accept the request from the MCD 105 and generate the requested authenticating signature. If the CMS 104 accepts the request, the CMD 103 may generate the requested second authenticating signature and transmit the second authenticating signature to the MCD 105.

A variety of factors may affect whether the CMS 104 accepts the request from the MCD 105. For instance, if the CMS 104 fails to successfully authenticate the MCD 105, it may deny the request. As another example, the CMS 104 may examine the contents of the proposed transaction and determine if the transaction complies with a transaction policy for the cryptocurrency address 107. For example, the transaction policy may indicate that the server will only approve transactions under a certain value or that the server will not approve any transactions that result in exceeding a maximum spending limit from some set time period, such as per day, per week, or per month. The contents of the policy may be set by the user or may be a default policy enforced by the CMS 104 for security reasons. Typically, though not necessarily, to approve a transaction that violates the transaction policy of the CMS 104, the CMD 103 is used to provide the second authenticating signature.

In the event the CMS 104 rejects the request, the CMS 104 may respond in a variety of ways, depending on the reasons for the rejection. For example, the CMS 104 may communicate with the MCD 105 to indicate the reason the request was rejected. In particular, the CMS 104 may indicate to the MCD 105 if the CMS 104 was unable to authenticate the MCD 105 or may indicate that the authentication was successful but one or more of the CMD's requirements to authorize a transaction was not met (e.g., the proposed transaction does not comply with the CMS's transaction policy for the cryptocurrency address 107).

In response to a request rejection, the MCD 105 may take several actions, also possibly depending on the reason for the rejection. For example, if the MCD 105 determines that the reason for the rejection can be remedied, it may perform the correction and send a new request to the CMS 104.

If the MCD 105 is unable to remedy the reason for rejection—either because of the reason for the rejection or because too many retried requests have been sequentially rejected—the MCD 105 may indicate to the user that authenticating the transaction has failed. This indication may also include information about the reason for the failure. Additionally, the MCD 105 may also, if it has not done so already, attempt to authenticate obtain the second authenticating signature from the CMD 103. If the CMD 103 requires that requests for it to generate a second authenticating signature be conducted only over a short-range communication protocol, the MCD 105 may prompt the user to retrieve the CMD 103 (or bring the MCD 105 into close physical proximity to it) and, when the user confirms the CMD 103 is nearby, may request a second authorizing signature for the proposed transaction, as previously described.

Eventually, the MCD 105 may obtain the second and third authenticating signatures from the CMD 103 and the CMS 104. After they are received, the MCD 105 may combine them with the first authenticating signature to generate a fully authenticated cryptocurrency transaction. Specifically, the MCD 105 may obtain the second and third authenticating signatures and, after they are obtained, use the second and third authenticating signatures, along with the first authenticating signature, to generate a fully authenticated cryptocurrency transaction.

Note that the method described here is performed with the MCD 105 as the initiator of the transaction. However, as noted above, either of the CMD 103 or the CMS 104 may alternatively initiate the transaction. In such a case, the initiating device or system may perform the same or similar steps performed by the MCD 105.

In some embodiments, the cryptocurrency management system 102 may comprise multiple MCDs, each with their own private key share. As a consequence of having multiple MCDs, there may be more than three private key shares spread across the devices comprising the cryptocurrency management system 102. For example, in an embodiment where there are two MCDs, there may be four private key shares: one private key share at the CMD 103, one private key share at the CMS 104, one private key share at the first MCD 105, and one private key share at the second MCD 105. When there are multiple MCDs present, the threshold requirements (i.e., what signatures are necessary) to authorize a transaction involving the cryptocurrency address 107 may vary. For example, in some embodiments any two signatures produced from any two private key shares—including the two private keys associated with two MCDs—may be sufficient to authorize a transaction. In some embodiments the signature from either the CMD 103 or the CMS 104—along with at least one signature from any other device—may be required to authorize a transaction.

In some embodiments having multiple MCDs 105, each MCD 105 may be associated with a different user. For example, in a family of 3, such as a husband, wife, and their son, the cryptocurrency management system 102 may comprise three MCDs: one for the husband, one for the wife, and one for the son. Note that the relationship between the different users need not be familial. For example, in some embodiments the multiple users may be officers of a corporation.

In some embodiments having multiple MCDs 105, the limitations of the transaction policy enforced by the CMS 104 may differ depending on which MCD (more precisely, on which MCD's private key share) is used to generate a signature. For example, in an embodiment comprised of two MCDs 105, the transaction policy with respect to the first MCD 105 may have a higher spending limit than with respect to the second MCD 105. This may be a useful mechanism to enforce different limitations based on the identity of the user which, in many circumstances, has a one-to-one correspondence with a particular MCD 105. For instance, take the previous example where a father, mother, and son each have an MCD 105. The transaction policy may be that the father and mother's MCDs may be used to authorize transactions up to $100 dollars while the son's MCD may be use only to authorize transactions up to $20 dollars. Other embodiments may have different transaction policy variations based on the stored private key share's owner.

Various means may be employed to enforce different transaction policy limitations based on the identity of the MCD 105 (more precisely, the identity of the MCD's CA private key share 110) whose signature is being used to authorize the transaction. For example, in some embodiments a signature from the CMS 104 may be required to authorize any transaction (except, possibly, for transactions including the signature from the CMD 103), no matter how many other signatures from other devices are included. This may allow the CMS 104 to always assess a transaction for compliance with its transaction policy and to refuse to provide a signature for proposed transactions that violate the transaction policy, requiring either the use of a different MCD 105 or, possibly, the use of the CMD 103 to authorize the transaction. Alternatively, in some embodiments the transaction policy may only be enforced if the CMS 104 is used as the source of the second authenticating signature and other MCDs 105 may be able to provide a second authenticating signature sufficient to fully authorize the proposed transaction, even if the proposed transaction violates the transaction policy of the CMS 104.

Note that, if multiple MCDs 105 contribute their signature to a proposed transaction and—for some reason—request an additional signature from the CMS 104, the CMS 104 may apply any one of the device's transaction policy limitations when determining whether to provide the CMS's authenticating signature. For example, in some embodiments the CMS 104 may choose the transaction policy of the device (whose signature is present in the request) that has the broadest (i.e., least restrictive) limitations. In some embodiments, the CMS 104 may choose the transaction policy of the device that has the narrowest (i.e., most restrictive) limitations. In other embodiments, the CMS 104 may employ different criteria in selecting which transaction policy limitations to apply to a multiple-MCD authentication request.

Figure 12:
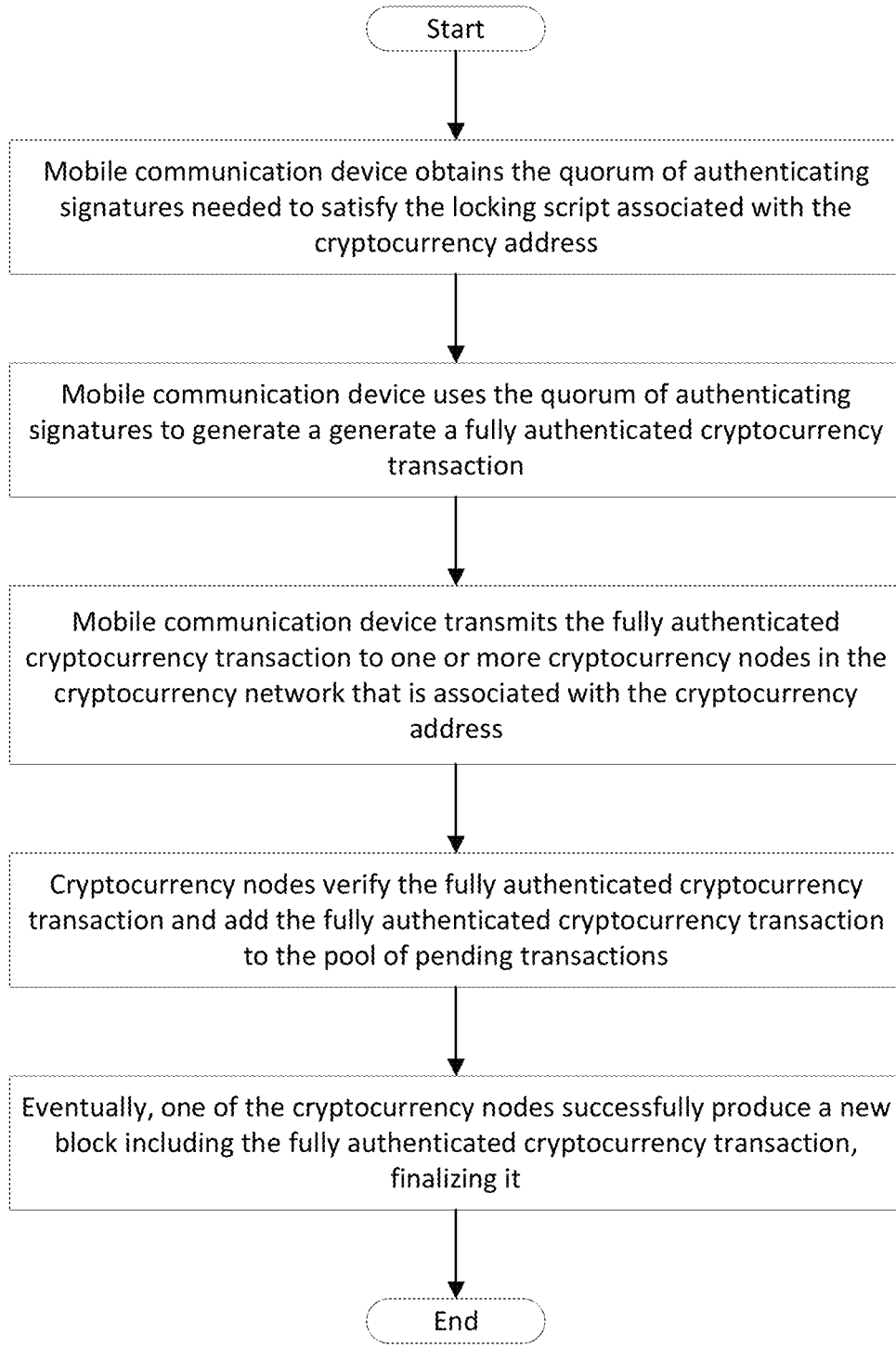
FIG. 12 is a flowchart illustrating an exemplary method of finalizing an authenticated cryptocurrency transaction with a cryptocurrency network, such as the cryptocurrency network of FIG. 1.

FIG. 12 is a flowchart of an exemplary method of finalizing an authenticated cryptocurrency transaction with a cryptocurrency network 106, such as the cryptocurrency network of FIG. 1. To start, as shown by the figure, the MCD 105 obtains the quorum of signatures needed to satisfy the locking script associated with the cryptocurrency address. After the MCD 105 obtains the quorum of signatures, the MCD 105 may use the quorum of authenticating signatures to generate a fully authenticated cryptocurrency transaction, and as shown by the next step, the MCD 105 may transmit the fully authenticated cryptocurrency transaction to one or more cryptocurrency nodes 204 in the cryptocurrency network 203 that is associated with the cryptocurrency address.

After they receive the fully authenticated cryptocurrency transaction, the cryptocurrency nodes 203 may verify the fully authenticated cryptocurrency transaction and, after having verified the transaction, add the fully authenticated cryptocurrency transaction to the pool of pending transactions. Eventually, one of the cryptocurrency nodes 204 successfully produces a new block 303 including the fully authenticated cryptocurrency transaction. After this new block is produced and distributed to the other cryptocurrency nodes 204 in the cryptocurrency network 203, the cryptocurrency transaction is effectively finalized.

Generally, the cryptocurrency management system 102 is associated with a security policy (with respect to a given cryptocurrency address 107). The security policy, among other things, details the requirements for controlling the cryptocurrency address 107. As an example, this involves the security policy specifying the number of authenticating key shares and the number of them (referred to as the quorum) that is required to approve a financial transaction involving the cryptocurrency address (specifically, the number of authenticating signatures generated from the authenticating key shares).

Note that, with regards to the cryptocurrency network 203, the requirements to use the cryptocurrency assets associated with the cryptocurrency address 107 are controlled by the locking scripts of the transactions associated with the cryptocurrency address 107. Thus, to effectuate the security policy associated with the cryptocurrency management system 102 (and to effect changes to the security policy), a first step may be to generate a transaction using the funds associated with the cryptocurrency address 107 as both input and output, with the output specifying a locking condition in accordance with the cryptocurrency management system's associated security policy. Thus, part of the process of configuring the cryptocurrency management system 102 is setting-up the cryptocurrency address 107 so that it conforms to this security policy.

Figure 13:
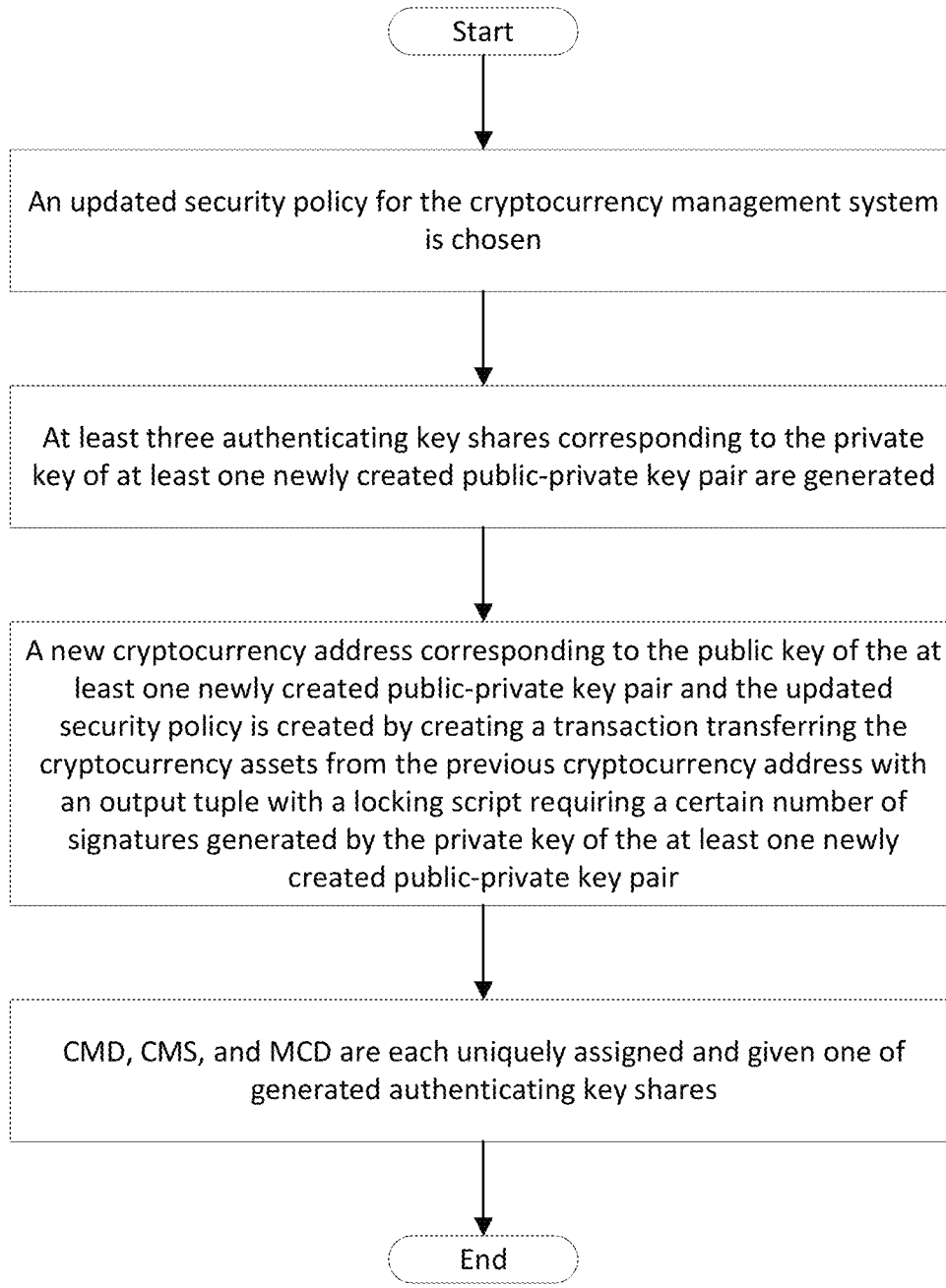
FIG. 13 is a flowchart illustrating an exemplary method of modifying the security policy of a cryptocurrency management system.

FIG. 13 is a flowchart of an exemplary method of modifying the security policy of a cryptocurrency management system 102. To start, an updated security policy for the cryptocurrency management system 102 is chosen, and as shown by the next step, at least three new authenticating key shares are generated using (one or more private keys of) one or more newly generated public-private key pairs. In addition, a new cryptocurrency address corresponding to the newly generated one or more public-private key pairs and the updated security policy is created by creating a transaction transferring the cryptocurrency assets from the previous cryptocurrency address with an output tuple with a locking script requiring a certain number of signatures generated by the newly generated public keys' corresponding private keys. After the new cryptocurrency address is created, the CMD 103, the CMS 104, and the MCD 105 are each uniquely assigned and sent one of the authenticating key shares corresponding to the private keys of the one or more new public-private key pairs.

Note that the security policy may involve more detailed requirements than just the quorum of authenticating signatures for authenticating a transaction. For example, in some embodiments, the security policy may make the quorum conditional on the occurrence of certain events. One such event may be the passage of a certain amount of time without any user initiated activity with the cryptocurrency address 107. If this occurs, the quorum can be reduced (e.g., from three authenticating signatures to two authenticating signatures) or otherwise changed. This may be useful in preventing loss of access to the cryptocurrency address due to the loss or failure of one of the CMD 103, the CMS 104, or the MCD 105. By automatically reducing the quorum when there is no user-initiated activity (as might be the case when a user could not conduct any activity because of a missing or failed device), this may improve the ability to maintain access to the cryptocurrency address while still maintaining robust security.

One way that the conditional change to the quorum number may be implemented is using time-based condition requirements in the locking script of the transaction. For example, if the cryptocurrency involved is Bitcoin, the CHECKLOCKTIMEVERIFY command may be used to make parts of the locking script conditional on the passage of a certain amount of time. Thus, to implement a change in the quorum condition—say based on a lack of activity for 30 days—the locking script may be structured such that it is satisfied by either the production of a certain number of authenticating hashes (the usual quorum number) or by, after the passage of time specified by CHECKLOCKTIME-VERIFY, the production of one (or other number) less number of authenticating hashes. Whenever activity involving the cryptocurrency address 107 occurs (before the specified passage of time), the cryptocurrency management system 102 may refresh the timer by generating a new transaction with the cryptocurrency funds with the CHECK-LOCKTIMEVERIFY changed to be 30 days from the time of the new transaction.

As another example, there could also be a fourth authenticating key share (in addition to the primary three distributed to the CMD 103, the CMS 104, and the MCD 105). The security policy may generally be that this fourth authenticating key share is inactive and that inactive key shares (and their corresponding signatures) do not contribute to obtaining the needed quorum. However, the security policy could also be that the fourth authenticating key share may become active on the occurrence of a certain event. One such event may be the passage of a certain amount of time without any activity or certain activities involving the cryptocurrency address. If this occurs, the fourth authenticating key share can be activated. This may be useful in preventing loss of access to the cryptocurrency address due to the loss or failure of one of the CMD 103, the CMS 104, or the MCD 105. By automatically enabling another authenticating key share when there is no activity (such as might occur when a user could not conduct any activity because of a missing or failed device), this may improve the ability to maintain access to the cryptocurrency address while still maintaining robust security.

The fourth authenticating key share may, in general, be located on a variety of devices of systems. One example is that the fourth authenticating key share is also held by the CMS 104. This may be particularly useful because the CMS 104, as a typically larger distributed network, is less likely to suffer catastrophic failure. By making the fourth authenticating key share conditionally active, this enables a user to gain the reliability of storing the authenticating key shares necessary (e.g., for a quorum of 2) to access the cryptocurrency address 107 with a commercial operator without having to yield immediate control over their cryptocurrency funds to the operator.

As previously mentioned, for consumers, many financial transactions involve the consumer exchanging some form of currency with a seller for some kind of good or service in exchange). In today's world, this exchange of currency is increasingly done via electronic systems that, at some point, involve communication via a network, such as the internet. Contributing to this increase is that financial transactions are increasingly conducted using payment cards (e.g., debit cards or credit cards) and mobile payment services as opposed to physical cash or checks.

While electronic transfer of funds does provide advantages, particularly in the form of increased convenience, it also presents some drawbacks, such as being unable to conduct a transaction without an active internet or other type of network connection. While this may be an acceptable tradeoff in many circumstances, there are still many occasions where the requirement of an active internet connection is problematic. Despite its seeming ubiquity, there are still many occasions where internet service is unreliable or unavailable when users are looking to make a financial transactions. In such situations, a lack of internet connectivity can be a significant impediment to one or more parties seeking to engage in a financial transaction.

Moreover, to the extent that methods exist that do not rely on internet connectivity, such as physical currency, they do not solve this problem. In this regard, such methods may be either (or both) inconvenient or disfavored by either one or more parties in a financial transaction. In the case of the latter, this often leads to the method of payment not being available because either a party cannot or will not use or accept it. For many purchases or other types of fund transfers, convenience is often a strong factor in whether a party will actually initiate a financial transaction. Impediments to the transaction generally make it less likely to occur.

Take, for example, physical currency (e.g., paper money or coins). In theory, physical currency allows financial transactions to be settled locally (and anonymously) between a buyer and seller without needing any kind of active internet connection or communication with a third-party. However, relying on physical currency suffers from the problems identified above. For a variety of reasons, individuals are increasingly carrying less physical currency, meaning that, for a seller, attempting to rely on cash to conduct financial transactions, sales may be reduced.

Of course, a seller could, in theory, "accept" a payment using a payment card even without an active internet connection. Specifically, a seller could "accept" payment by recording the relevant information (e.g., credit card number and the agreed upon amount of payment) and then later using that recorded information to actually effect the transaction with the relevant third-party (the credit card issuer) when an active internet connection is available. However, this presents a substantial significant risk of fraud. The risk of fraud is even greater for many of the events where there is a lack of a reliable internet connection, because their nature is often to be one-off exchanges. In other words, many of these exchanges are likely to occur where the buyer and seller are unknown to one another and are unlikely to easily encounter one another again. This means that finding the other party after the transaction is likely to be difficult if at all possible.

In addition, even when an internet connection is available, one party in a transaction may be reluctant to share with the other party certain information, such as an account number or other personal information required for an electronic transfer of funds. As an example, two parties may desire to split an expense, such as a taxi fee or dinner check, by transferring funds from one party to the other, but both parties may be reluctant to share personal information related to the transaction, such as an account of a financial account to be used in the transfer.

In some embodiments, one or more components of the cryptocurrency management system 1402, such as the MCD 1405, may utilize assets stored locally to settle financial transactions directly, without requiring a concurrent internet connection. Specifically, embodiments of the present disclosure may utilize a MCD 1405 to directly (i.e., in a peer-to-peer fashion) conduct and settle a financial transaction with another MCD. To accomplish this goal, each MCD (also referred to herein as "mobile device" for simplicity) may have a mobile wallet located within its non-volatile memory, which can be used to store financial assets (e.g., a digital currency, such as Bitcoin). At some point prior to their interaction, the MCD that is exchanging financial assets (e.g., that is being used to "pay") transfers financial assets into its mobile wallet from a financial service provider. Consequently, the MCD can then transfer these financial assets, or a portion of them, to the mobile wallet of the second MCD. After the transaction, the second MCD can then transfer these financial assets from its mobile wallet to a financial service provider or other entity as may be desired. Note that this may also be implemented on MCDs that are not part of a cryptocurrency management system 1402.

Figure 14A:
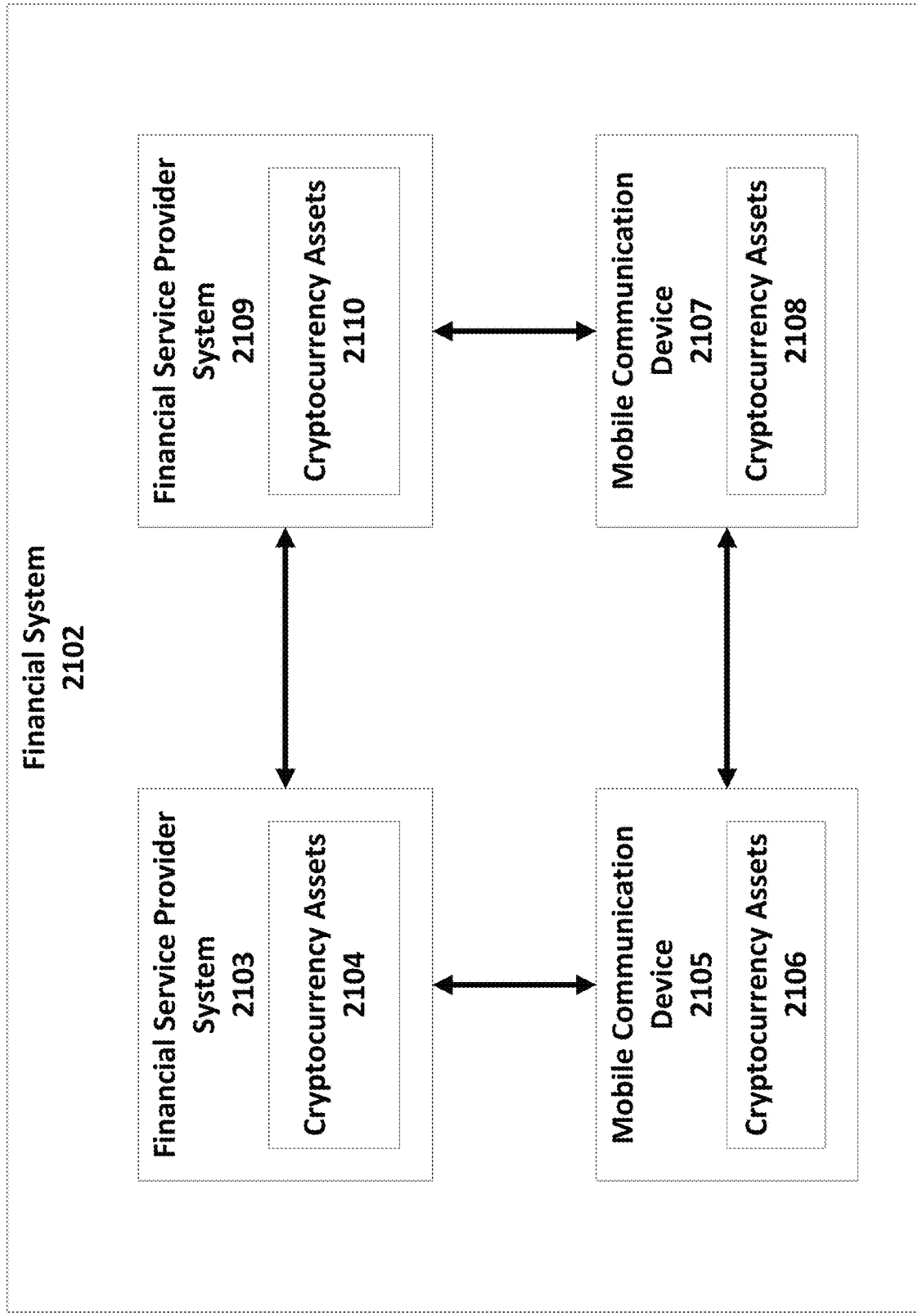
FIG. 14A is a block diagram illustrating a financial system, according to an exemplary embodiment of the present disclosure.

FIG. 14A is a block diagram of a financial system 2102 having MCDs 2105 and 2107 that are configured to perform a process of settling local peer-to-peer financial transactions as described above. The financial system 2102 may also comprise a first financial service provider system 2103 and a second financial service provider system 2109. The financial service provider system 2103 may be associated with (e.g., managing) cryptocurrency assets 2104 owed by the user of MCD 2105. Similarly, the financial service provider system 2109 may be associated with cryptocurrency assets 2110 owed by the user of MCD 2107.

Broadly speaking, the MCDs 2105 and 2107 may directly communicate with one another to initiate and settle a financial transaction. Towards this end, prior to the transaction, the MCD 2105 may communicate with financial service provider system 2103 to obtain some or all of cryptocurrency assets 2104 in the form of cryptocurrency assets 2106. The cryptocurrency assets 2106 may be used by the MCD 2105 in settling various financial transactions. In a somewhat mirrored process, after the financial transaction is settled and some or all of the cryptocurrency assets 2106 are received by the MCD 2107 as cryptocurrency assets 2108, the MCD 2107 may communicate with its financial service provider system 2109 to transfer some or all of the cryptocurrency assets 2108 to the financial service provider system 2109, where they are stored as cryptocurrency assets 2110. In addition, the financial service provider systems 2103 and 2109 may communicate with one another for various reasons, such as for financial service provider system 2109 to inform financial service provider system 2103 that the transferred assets from MCD 2105 have been deposited.

Figure 14B:
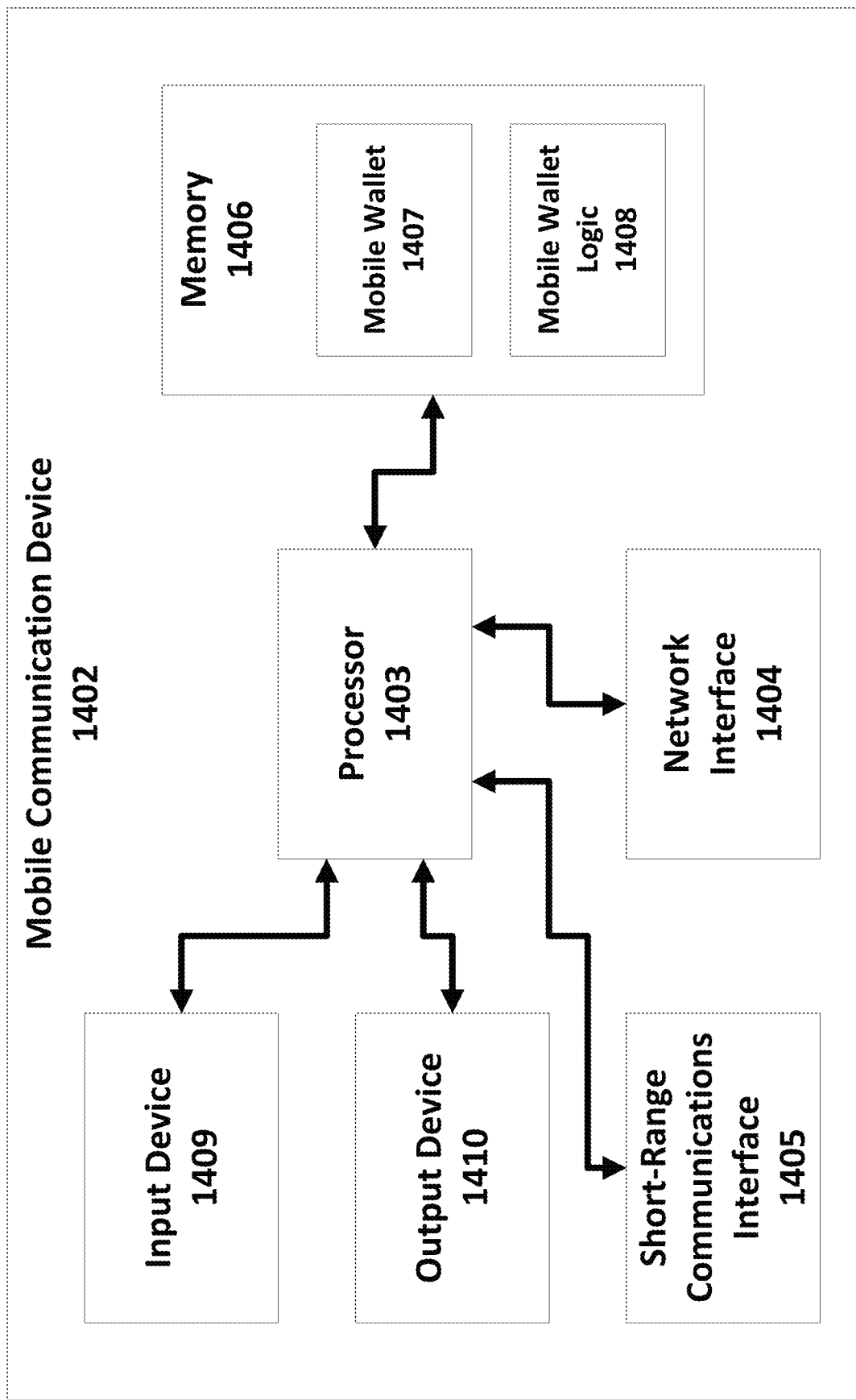
FIG. 14B is a block diagram illustrating a mobile communication device, according to an exemplary embodiment of the present disclosure.

FIG. 14B is a simplified schematic illustrating an exemplary embodiment of an MCD 1402, such as the MCD 2105 of FIG. 14A. As shown by the figure, an MCD 1402 may comprise at least one processor 1403 that is connected to a network interface 1404, a short-range communications interface 1405, and a memory 1406. In general, the processor 1403 may interact and control these components, as well as other components of the MCD 1402, in order to orchestrate the functioning of the device. The network interface 1404 may comprise circuitry configured to communicate with other devices over various networks, such as the internet. As an example, the network interface 1404 may comprises modems, wireless radios (e.g., cellular transceivers), or other devices that are designed to communicate with network access points, such as cellular towers, network routers, Wi-Fi hots spots, or other types of access points. The short-range communications interface 1405 may comprise circuitry configured to communicate with other nearby devices using short-range peer-to-peer wireless connectivity. As an example, the short-range communications interface 1405 may comprise a wireless radio that is configured to communicate in accordance with an established short-range protocol, such as Bluetooth, Near Field Communication (NFC), or radio frequency identification (RFID). In some cases, such as when NFC is used, active or passive load modulation may be used for the short-range communication. In general and as is relevant here, the network interface 1404 may be used to communicate with various financial service providers and the short-range communications interface 1405 may be used to communicate with other nearby readers or other types of devices (e.g., smartphones).

The memory 1406 is connected to and editable by the processor 1403. The memory 1406 may store, among other things, a mobile wallet 1407 and a mobile wallet logic 1408. As described further below, the mobile wallet 1407 may be used to store data representing financial asserts. As also described further below, the mobile wallet logic 1408 may contain instructions that can be executed by the processor 1403 to perform various functions of the MCD 1402 described herein, including the transfer financial assets (e.g., between an account at a financial service provider and the mobile wallet 1407 or between the mobile wallet 1407 and the mobile wallet of another MCD).

In operation, the processor 1403 may execute the instructions of the mobile wallet logic 1408 to either transfer financial assets between a financial service provider and the mobile wallet 1407 or to transfer financial assets between the mobile wallet 1407 and the mobile wallet of another MCD. To transfer financial assets from a financial service provider to the mobile wallet 1407, the processor 1403 may interact with the network interface 1404 to communicate with the financial service provider. Similarly, to transfer assets from the mobile wallet 1407 to the mobile wallet of another MCD, the processor 1403 may interact with the short-range communications interface 1405 to directly communicate with the other MCD.

Note that the mobile wallet logic 1408 can be implemented in software, hardware, firmware or any combination thereof. In the exemplary MCD 1402 illustrated by FIG. 14B, the mobile wallet app 1408 is implemented in software and stored in the memory 1406. When implemented in software, the mobile wallet app 1408 can be stored and transported on any computer-readable medium for use by or in connection with an instruction execution apparatus that can fetch and execute instructions, such as the processor 1403. In some embodiments, the mobile wallet logic 1408 may be part of a software application running on the MCD 1402. For example, the mobile wallet logic 1408 may be part of a software application ("app") of a financial service provider.

In some embodiments, the MCD 1402 may also comprise an input device 1409 and an output device 1410. Generally speaking, the output device 1503 is configured to communicate information to a user through some mechanism, such as a digital display. The processor 1403 may interact with the output device 1503 to transmit data to the user. Conversely, the input device 1409 is configured to receive input from the user of the MCD 1402. For example, the input device 1409 may be a touch screen that is capable of receiving user input in the form of taps, gestures, and other physical interactions with the screen. As indicated by this example, the input device 1409 and the output device 1410 may, in some embodiments, comprise the same device (e.g., a touchscreen display). Additionally, in some embodiments, either or both of the input device 1409 and the output device 1410 may comprise more than one physical device.

Similar to the MCD 105 of FIG. 8, the MCD 1402 may be implemented as a smartphone, such as the smartphone depicted in FIG. 9. Not shown are the processor and memory internal to the smartphone 902 but which function similarly to the processor 803 and the memory 805 of FIG. 8.

Figure 15:
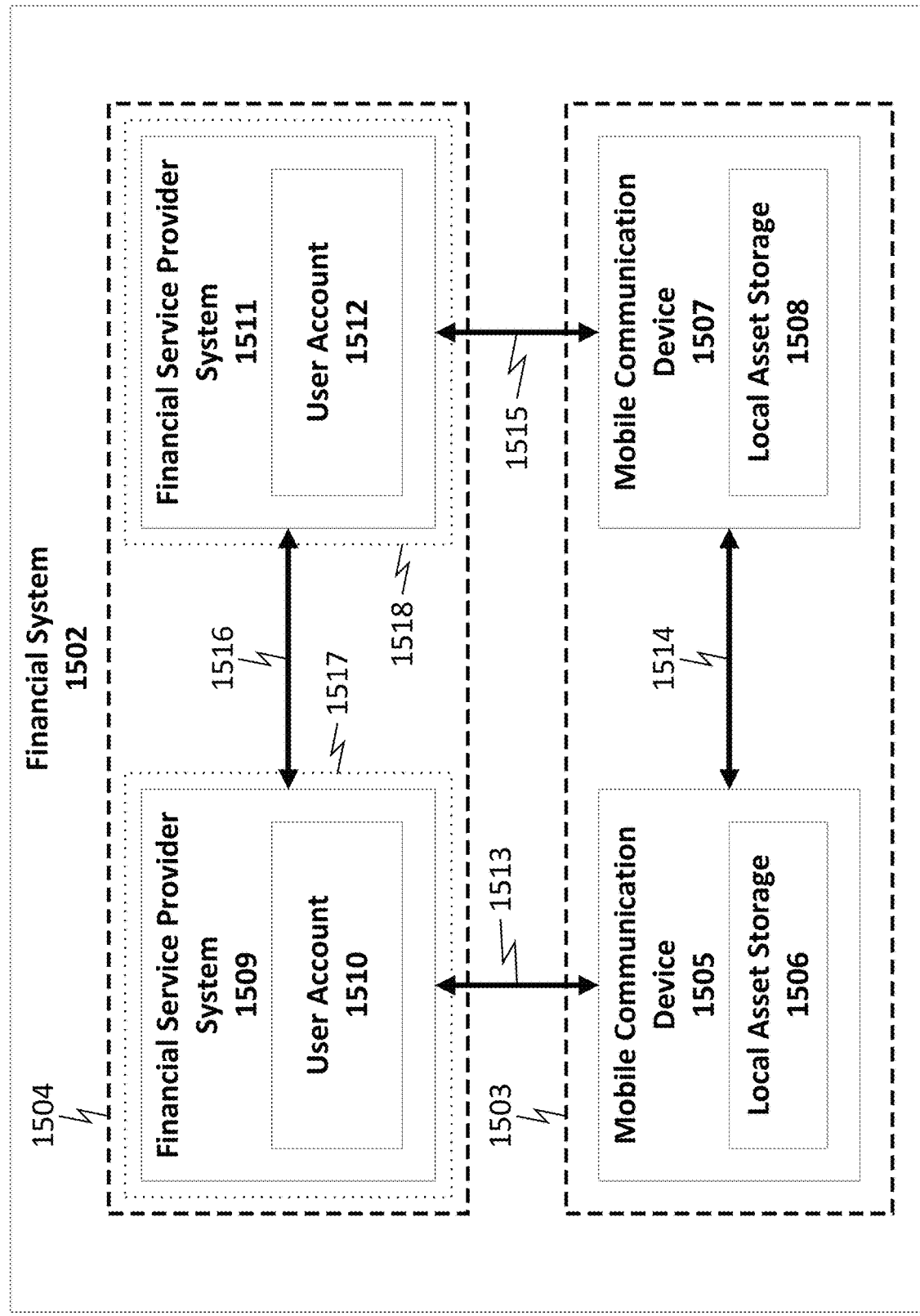
FIG. 15 is a more detailed block diagram of the financial system shown in FIG. 14A.

FIG. 15 is a block diagram illustrating a more detailed view of the financial system 2102 shown in FIG. 14A. As shown by the figure, the financial system 1502 may comprise MCDs 2105 and 2107 that are configured to perform a process of settling local peer-to-peer financial transactions as described above. Note that each of the MCDs 2105 and 2107 may be configured in accordance with the MCD 1402 depicted by FIG. 14B. The financial system 2102 may also comprise the first financial service provider system 2103 and the second financial service provider system 2109. The financial service provider system 2103 is associated with a first financial service provider 1517 and the MCD 2105. Similarly, the financial service provider system 2109 is associated with a second financial service provider 1518 and the MCD 2107.

Broadly speaking, the MCDs 2105 and 2107 may directly communicate with one another, over a communication channel 1514 (e.g. NFC, RFID, or Bluetooth), to initiate and settle a financial transaction. Towards this end, prior to the transaction, the MCD 2105 may communicate with financial service provider system 2103, over a communication channel 1513 (e.g., via a network, such as the internet), to transfer financial assets (e.g., digital currency) onto the MCD 2105 that are then used in settling various financial transactions. In a somewhat mirrored process, after the financial transaction is settled, the MCD 2107 may communicate with its financial service provider 2109, over communication channel 1515 (e.g., via a network, such as the internet), to transfer financial assets it has received to the financial service provider system 2109. In addition, the financial service provider systems 2103 and 2109 may communicate with one another over a communication channel 1516 for various reasons, such as for financial service provider system 2109 to inform financial service provider system 2103 that the transferred assets from MCD 2105 have been deposited.

More precisely, the MCDs 2105 and 2107 have associated local asset storages—asset storages 1506 and 1508, respectively—that can be used by the MCDs 2105 and 2107 to store financial assets. For example, the local asset storages 1506 and 1508 may be used to store cryptocurrencies, such as Bitcoin or Ethereum. Each of these local asset storages is linked to a corresponding user account of a financial service provider. Thus, the local asset storage 1506 of the MCD 2105 is linked to a corresponding user account 1510 of the financial service provider 1517, with the corresponding financial service provider system 2103 being able to interact with and control various aspects of the user account 1510. Similarly, the local asset storage 1508 of the MCD 2107 is linked to a corresponding user account 1512 of the financial service provider 1518, with the corresponding financial service provider system 2109 being able to interact with and control various aspects of the user account 1512. Funds can be transferred between a user account and its linked local asset storage as well as between the local asset storages 1506 and 1508 of the MCDs 2105 and 2107.

In general, the financial system 2102 may be divided into two groupings: local grouping 1503 and remote grouping 1504. The local grouping 1503 comprises the MCDs 2105 and 2107 and the remote grouping 1504 comprises the financial service provider systems 2103 and 2109. Interactions between devices in local grouping 1503 occur locally (e.g., the devices are close, such as within several meters or less of one another, and communicate directly using short-range communications) whereas interactions with devices in remote grouping 1504, including interactions by a device in the remote grouping 1504 and a device in local grouping 1503 (e.g., MCDs 2105 and 2107) occur remotely (e.g., the devices are distant from one another and communicate using long-range communications).

This distinction can be illustrated with reference to the communication channel 1513, which, as previous mentioned, is used to transfer (i.e., load) funds onto the MCD 2105. The MCD 2105 and the financial service provider system 2103 (e.g., one or more servers or other hardware supporting the financial service provider's online operations) may be remote from one another (e.g., at least several kilometers). Thus, to communicate with one another, the MCD 2105 and the financial service provider system 2103 may use a wide area network (WAN), such as the internet. Conversely, the communication channel 1514, as previously mentioned, is used by two MCDs to conduct (e.g., initiate and settle) a financial transaction while in close physical proximity. Thus, to communicate with one another, the MCDs 2105 and 2107 use a direct (i.e., peer-to-peer) connection using some type of short-range communication protocol, such as NFC, RFID, or Bluetooth.

Figure 16:
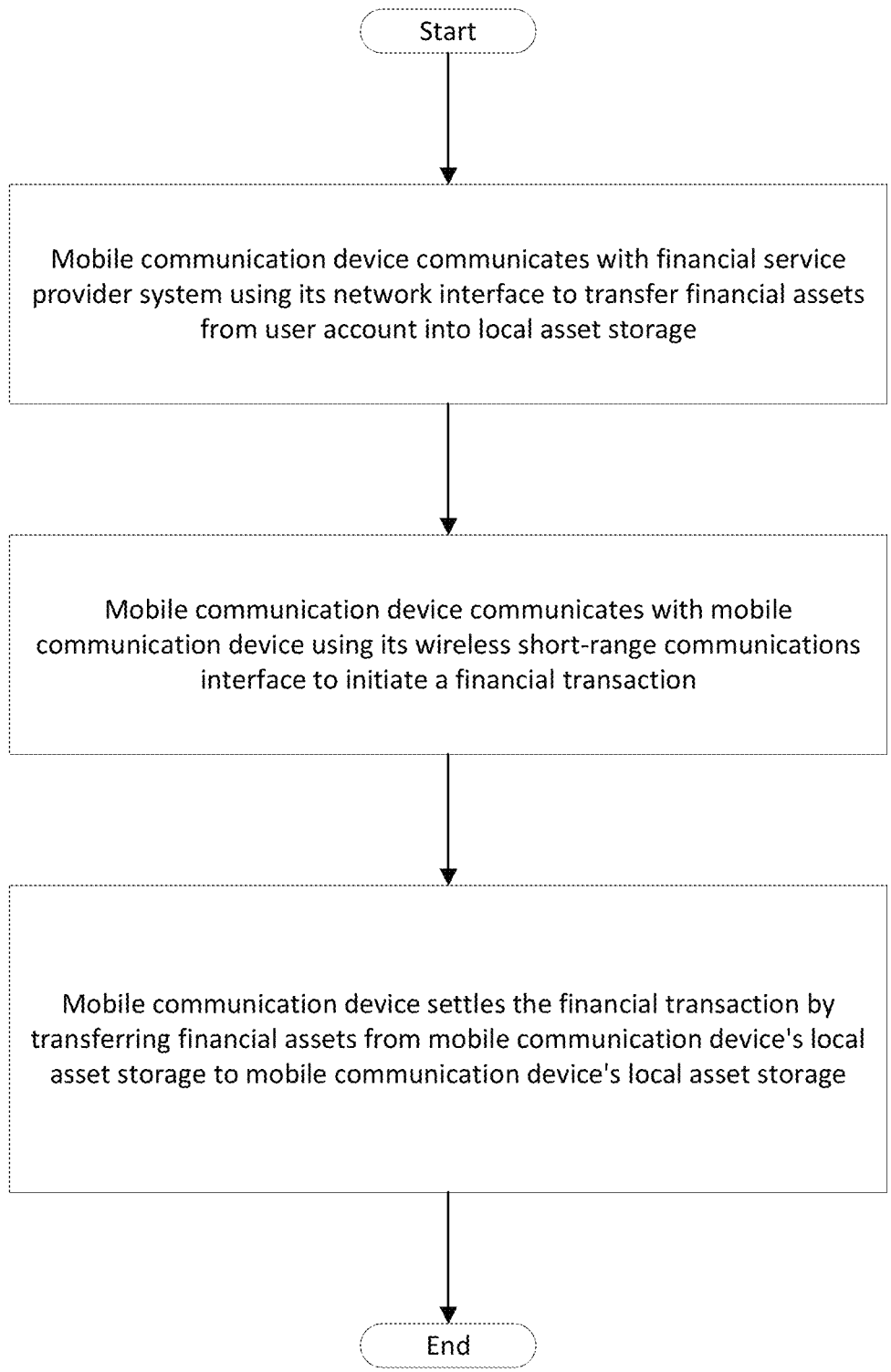
FIG. 16 is a flowchart illustrating an exemplary method of locally conducting a financial transaction.

FIG. 16 is a flowchart illustrating a process of locally conducting a financial transaction between the MCDs 2105 and 2107 and the financial service provider systems 2103 and 2109 of FIG. 15. Briefly, the process involves (1) preemptively transferring financial assets from financial service provider system 2103 onto the MCD 2105, (2) using the MCD 2105 to enter a financial transaction with the MCD 2107, and (3) settling (e.g., paying for) the transaction using the locally stored funds.

To start, the process begins with the MCD 2105 communicating with the financial service provider system 2103 to acquire and transfer financial assets into the MCD's local asset storage 1506. More precisely, the MCD 2105 communicates with the financial service provider system 2103 via communication channel 1513 using MCD's network interface 1404. This exchange involves communicating over a network, such as the internet. In general, the purpose of this step is to locally store financial assets on the MCD 2105 that can be accessed and transferred to the MCD 2107 without needing to communicate with a third-party to effectuate the transfer.

Broadly speaking, the financial assets should be stored on the MCD 2105 in such a form that, like physical currency, their validity and authenticity can be verified by other parties in a transaction without needing to query a third-party over the internet. An example of a suitable digital financial asset is cryptocurrency.

Note that the financial assets may be transferred from a financial service provider. As discussed further below, having the financial assets taken from a financial service provider helps to avoid double-spend attacks. Since digital data can be endlessly copied, financial assets represented by digital data can be duplicated by a malicious actor and subsequently reused in later transactions. This problem is usually avoided by the party to whom a financial asset is being transferred (e.g., a seller) announcing to relevant third-parties that the financial asset has been transferred, as is done with cryptocurrency transactions. These third-parties then know not to accept the financial asset if it is being sent from the malicious actor. Who the relevant third-parties are may depend on the specific financial assets in question. In general, however, for a given specific financial asset, the identity of the relevant third-parties is usually public (and widely available) information.

For example, for cryptocurrencies, the relevant entities are the collective Bitcoin nodes. Pragmatically, however, alerting the nodes of the Bitcoin network can be done by alerting a few of the nodes that then facilitate propagating knowledge of the transaction to the other nodes in the Bitcoin network. A similar process can occur for other cryptocurrencies.

Unfortunately, without a reliable internet connection, this method can be unavailable, at least temporarily. This can be mitigated by having the transferred financial assets to be linked to the financial service provider (and to a specific account at the financial service provider). This information can be used, for example, to allow the financial service provider to guarantee against any double-spent financial assets (and then seek action against the fraudulent actor).

After the financial assets are transferred onto the asset storage 1506 of the MCD 2105, the MCD 2105 can then be used to locally conduct and settle offline, peer-to-peer financial transactions with other MCDs (e.g., MCD 2107). Accordingly, at some point after the financial assets are obtained, the MCD 2105 may be used to initiate a financial transaction with the MCD 2107. More precisely, after the MCD 2105 stores the financial assets into its local storage 1506, the MCD 2105 may initiate and finalize a financial transaction with the MCD 2107. In particular, the MCD 2105 may communicate with the MCD 2107 via communication channel 1514 using the MCDs' respective short-range network interfaces 1405. This exchange can involve directly communicating using peer-to-peer short-range wireless communication protocols, such as Bluetooth, Wi-Fi, near-field communication (NFC), Ultra-wideband (UWB), IEEE 1902.15.4, or RFID.

In general, a purpose of the second step of FIG. 16 is to actually create a financial transaction that needs to be settled. It is important to note here two related but distinct potential meanings of "financial transaction," largely revolving around interactions between the MCDs or interactions between the human users of the MCDs. In other words, the MCDs 2105 and 2107 are associated with and being operated by human users (e.g., a buyer and a seller). In many situations, it is likely that the buyer and seller verbally discuss and agree to a transaction, with the MCDs 2105 and 2107 being used to settle the transaction. The second use of "financial transaction" is the interactions between the MCDs 2105 and 2107 (and also between the users and their respective MCDs) that are used to formalize the transaction on the MCDs so that the stored financial assets can be used to settle the transaction (e.g., pay for goods being bought).

As an example and as will be discussed more thoroughly below, initiating a financial transaction using an MCD 2105 may involve the user (e.g., a seller) of the MCD 2107 using the MCD 2107 to send a request to open a transaction session with the MCD 2105. The user of the MCD 2105 (e.g., a buyer) may accept this request, starting the transaction session and thus initiating a financial transaction. The seller could then send the details of the proposed transaction from their MCD 2107 to the buyer's MCD 2105. The buyer could accept the proposed transaction, which would finalize it, making it ready to be settled. Notably, the details of the proposed financial transaction could have already been established by verbal discussion between the buyer and seller, with the interactions between the MCDs being to formalize the transaction such that the MCD 2105 could use stored financial assets to settle the transaction.

In other embodiments, the steps taken by the users of the MCD 2105 and 2107 to initiate and settle the final transaction may be different. For example, in some embodiments the process may be simplified where the user of the MCD 2107 sends the details of the proposed transaction along with its request to open a transaction session, allowing the user of the MCD 2105 to immediately accept the transaction.

Eventually, once the financial transaction is initiated and finalized (e.g., its details are agreed upon), the MCD 2105 may use the financial assets from its asset storage 1506 to settle (e.g., pay for) the financial transaction. More specifically, the MCD 2105 may settle the financial transaction with the MCD 2107 by transferring assets from the local asset storage 1506 of the MCD 2105 to the local asset storage 1508 of the MCD 2107. In particular, the MCD 2105 communicates with the MCD 2107 via communication channel 1514 using the MCDs' respective short-range network interfaces 1405. This exchange again involves directly communicating using peer-to-peer short-range wireless communication protocols, such as Bluetooth, Wi-Fi, near-field communication (NFC), Ultra-wideband (UWB), or IEEE 1902.15.4.

At a high-level, this step is to "settle" (e.g., "pay for") the financial transaction in the same way that an exchange of traditional currency settles a financial transaction. Indeed, a result of this step is that the financial assets are transferred from the MCD 2105 to the MCD 2107. A consideration of this process is how the financial assets are transferred to the MCD 2107. In some embodiments, this transfer includes information in addition to the financial assets. For example, as discussed in further detail below, in some embodiments encrypted information about the user account associated with the financial assets is also included in the transfer. This information is useful in preventing or mitigating the possibility of fraud, particularly with respect to double-spend attacks.

Figure 17:
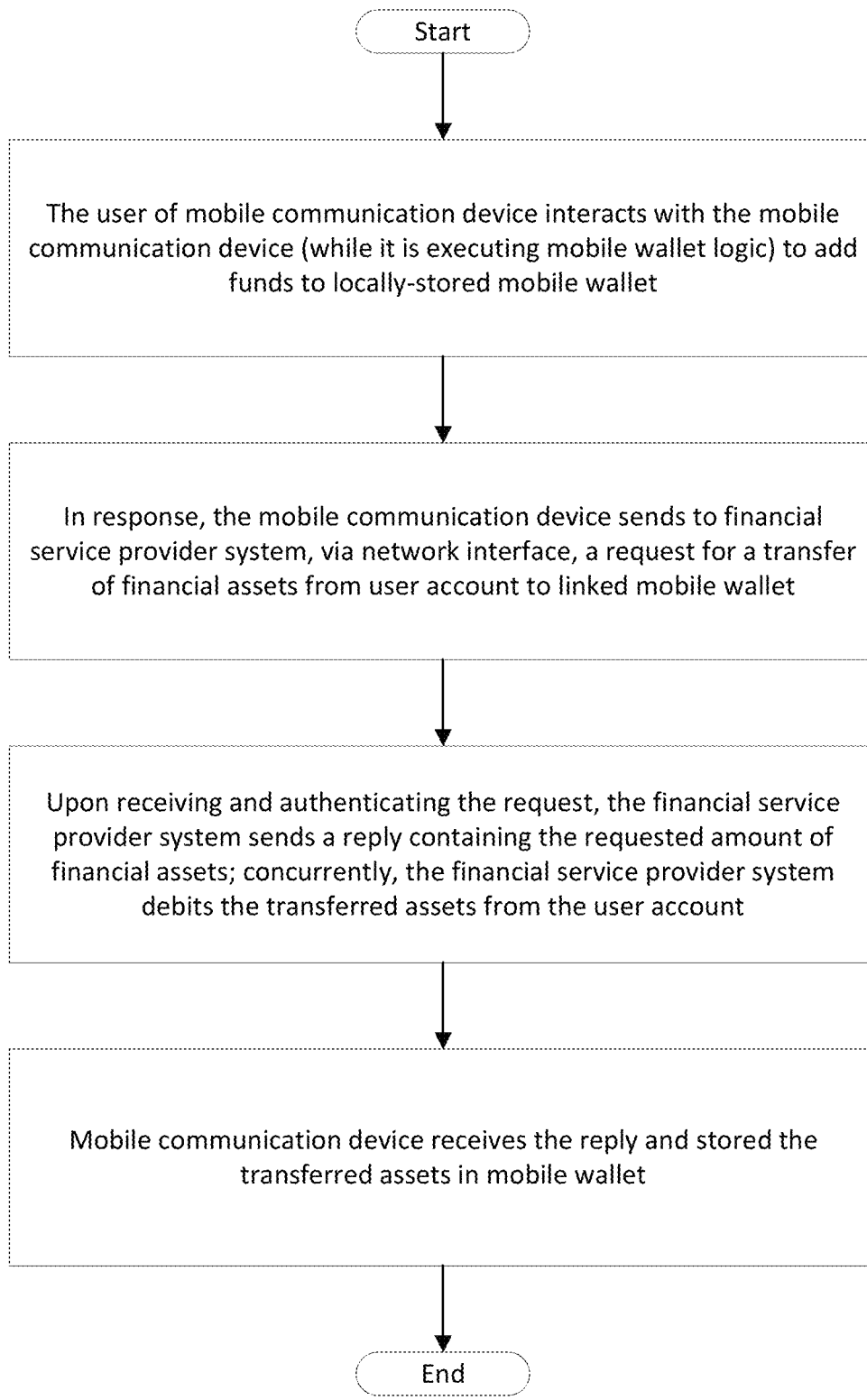
FIG. 17 is a flowchart illustrating an exemplary method of transferring funds from a financial service provider to a mobile wallet for a mobile communication device.

FIG. 17 is a flowchart illustrating a process of transferring funds from a financial service provider to a mobile wallet for an MCD, such as previously described in the first step of FIG. 16. To start, the user of MCD 2105 interacts with mobile wallet logic 1408 (running on the MCD 2105) to add funds to locally-stored mobile wallet 1506.

In some embodiments, the mobile wallet logic 1408 may be part of a mobile wallet application (a mobile wallet app). As part of its functioning, the mobile wallet logic 1408 may be linked to the user's user account 1510 at financial service provider 1517. The mobile wallet logic 1408 may also be linked to the local asset storage 1506. The mobile wallet logic 1408 may track the value of the financial assets stored within the user account 1510 (i.e., the balance of user account 1510), which it may display to the user. Similarly, the mobile wallet logic 1408 may track the value of the financial assets stored locally within local asset storage 1506 and display this value to the user. Showing these two values may allow a user to better judge when he or she should add funds to the local asset storage 1506. The mobile wallet logic 1408 may be configured to update the recorded values for the balance of user account 1510 and local asset storage 1506 whenever their balances change, such as when funds are transferred between the user account 1510 and local asset storage 1506.

After the user of MCD 2105 interacts with mobile wallet logic 1408 (running on the MCD 2105) to add funds to locally-stored mobile wallet 1506, the mobile wallet logic 1408, in response, sends to financial service provider system 2103, via network interface 1404, a request for a transfer of financial assets from the user account 1510 to the linked mobile wallet 1506.

After the mobile wallet logic 1408 sends to the financial service provider system 2103, via network interface 1404, a request for a transfer of financial assets from the user account 1510 to the linked mobile wallet 1506, the financial service provider system 2103, upon receiving and authenticating the request, sends a reply containing the requested amount of financial assets; concurrently, the financial service provider system 2103 debits the transferred assets from the user account 1510.

After the financial service provider system 2103 sends a reply containing the requested amount of financial assets, the MCD 2105 receives the reply and stores the transferred assets in mobile wallet 1506. After the MCD 2105 receives the reply and stores the transferred assets in mobile wallet 1506, the process is complete.

Figure 18:
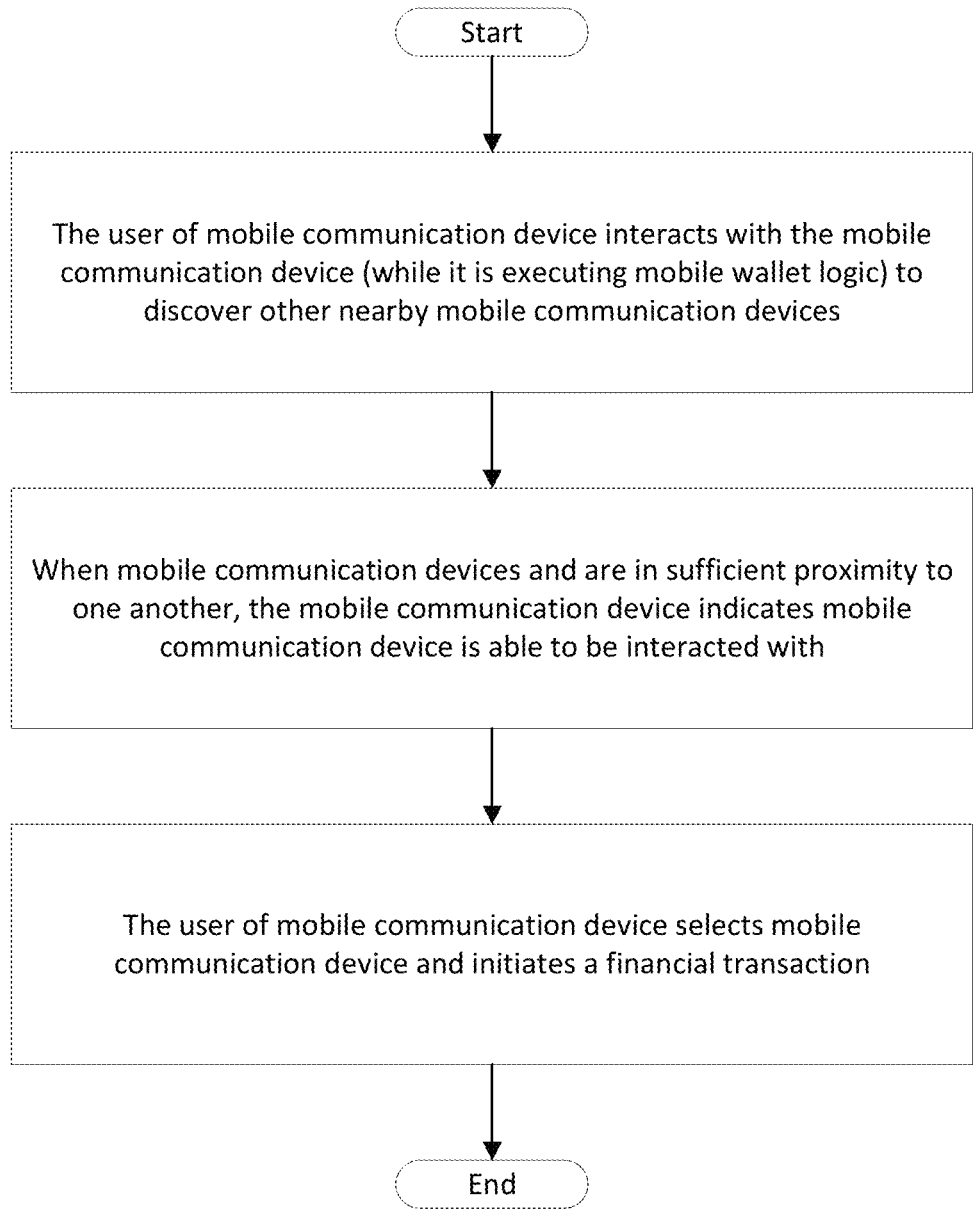
FIG. 18 is a flowchart illustrating an exemplary method of locally initiating a financial transaction.

FIG. 18 is a flowchart illustrating a process of locally initiating a financial transaction, such as previously described in the second step of FIG. 16. To start, the user of the MCD 2105 interacts with the mobile wallet logic 1408 (running on the MCD 2105) to discover other nearby MCDs.

After the user of the MCD 2105 interacts with the mobile wallet logic 1408 (running on the MCD 2105) to discover other nearby MCDs, the mobile wallet logic 1408 indicates, when the MCDs 2105 and 2107 are in sufficient proximity to one another for communication. As an example, when the MCDs 2105 and 2107 are within range of each other, the MCD 2107 may be configured to send an identifier unique to the MCD 2107 or the user of the MCD 2107 (e.g., a phone number or name associated with the device 2107 or the user of the device 2107), and the mobile wallet logic 1408 of the MCD 2105 may display such information to the user of the MCD 2105.

In some embodiments, the mobile wallet logic 1408 may sort or filter which nearby MCDs are shown by some criteria. For example, in some embodiments, the list of nearby MCDs may be ordered by proximity, with the proximity being estimated based on the strength of the signal received from each nearby MCDs. As another example, in some embodiments the list of nearby MCDs may be filtered to show only MCDs that are running some form of mobile wallet logic that is compatible with the mobile wallet logic 1408. Similarly, in some embodiments the list of nearby MCDs may be filtered to show only MCDs that have their form of mobile wallet logic actively open or that have actively provided input to their mobile wallet logic to expect a transaction.

Next, the user of the MCD 2105 selects the MCD 2107 and initiates a financial transaction. For example, upon viewing the displayed information identifying the MCD 2107, the user of the MCD 2105 may provide an input for selecting the MCD 2107, thereby confirming that the financial transaction is to occur with this MCD 2107. After the user of the MCD 2105 selects the MCD 2107 and initiates a financial transaction, the process of FIG. 18 is complete.

Note that NFC may be used to help ensure that the digital funds are transferred to the correct MCD 2107. In this regard, in NFC, the MCDs 2105 and 2107 are permitted to communicate only at a very short range, such as just a few inches. As such, it is unlikely that the MCD 2105 will be within range of a device other than the intended MCD 2107 during the transaction. Note that similar effects may be achieved with other protocols, such as RFID, depending on the communication range. For example, with Bluetooth, the communication range can extend much further, such as tens of feet, such that there is a realistic probability that multiple communication devices may in range of the MCD 2105 at the time of the transaction. In such an embodiment, other security measures may be employed to ensure that the assets are transferred to the appropriate MCD 2107.

In some embodiments, such as when NFC is used, the user of the MCD 2105 may provide inputs indicating or confirming the amount (e.g., dollar value) of the transfer and when the user is ready transfer the specified amount. In some embodiments this input may include the expected amount of the transaction from the perspective of the user of the MCD 2105, which the MCD 2105 may automatically compare to the value already present in the proposed transaction. If the values do not match, the MCD 2105 may display an alert to this user indicating that there is a mismatch.

One way the user of the MCD 2105 may provide this input is through touching a prompt shown on the touchscreen of the MCD 2105. Another way the user of the MCD 2105 may provide this input is by "tapping" the MCD 2105 against the MCD 2107. "Tapping" the MCD 2105 against the MCD 2107 may involve bringing the MCD 2105 (usually its back surface) into physical contact with the MCD 2107 (usually its back surface) and then brining the devices apart. Alternatively, "tapping" may involve bring the MCD 2105 into close physical proximity without touching—particularly so that they are communication range of one another—and then pulling the devices farther apart. In either case, during the tap, the MCD 2107 may communicate its identifier to the MCD 2105, which then transfers the specified amount of financial assets if the received identifier matches the one previously selected or otherwise approved by the user of the MCD 2105 for the transaction.

In such an embodiment, it is possible for the transfer to occur in a multi-tap process. Specifically, in a first tap between the MCDs 2105 and 2107, the MCD 2107 may transmit information about the transaction to the MCD 2105, such as the amount of the transaction and the identifier of the MCD 2107. During this first tap, the MCDs 2105 and 2107 may also exchange information to confirm that both devices have compatible resources for transferring the financial assets and completing the transaction. Upon receiving information about the transaction from the MCD 2107, the mobile wallet logic 1408 of the communication device 2105 may store the identifier and display a prompt to the user of the MCD 2105 requesting the user to confirm the transaction. Such prompt may include the amount of the transfer (as well as other information about the transaction, such as information received from the MCD 2107 during the first tap) and, if desired, the identifier received from the MCD 2107. Upon viewing such information, the user may provide an input confirming whether the transfer is authorized. If the amount of the transfer is not received from the MCD 2107, the user may also provide an input indicating the amount of the transfer.

Once the user of the MCD 2105 has confirmed the transaction, a second tap may be performed to permit the financial assets to be transferred from the MCD 2105 to the MCD 2107. As noted above, the mobile wallet logic 1408 of the MCD 2105 may transfer the financial assets based on an identifier received from the MCD 2107 during this second tap. In the current example, the mobile wallet logic 1408 may compare the identifier received from the MCD 2107 during the second tap to the identifier received during the first tap. If the compared identifiers match, thereby indicating that the MCD 2105 is currently communicating with the same MCD 2107 that provided the transaction information approved by the user of the MCD 2105, then the mobile wallet logic 1408 of the MCD 2105 may transfer the specified financial assets to the MCD 2107.

It should be emphasized that the two-tap transfer process described above is exemplary, and it is possible to transfer the financial assets using a different number of taps or not using taps at all. For example, in some embodiments the discovery of the MCD 2107 and the transfer of transaction information between the MCD 2105 and the MCD 2107 may occur based on user input to the devices without any taps being involved. Similarly, the confirmation and transfer of financial assets between the MCD 2105 and the MCD 2107 may occur based on user input confirming and finalizing the transaction, also without any taps being involved. This communication may happen over a variety of short-range communications protocols, such as Bluetooth or RFID.

As another example of the process described in FIG. 18 in the context of a buyer who is purchasing goods or services from a seller. After negotiating the transaction between themselves, the buyer and seller may initiate a financial transaction on their respective MCDs 2105 and 2107. To do so, the seller may have initialized his or her mobile wallet application to prime the MCD 2107 to initiate a financial transaction with another MCD (e.g., MCD 2105). The buyer and seller may then tap their MCDs 2105 and 2107 together, which prompts the MCDs to exchange information via near-field communication (NFC) for establishing a secure (financial) transaction session.

In some embodiments, the exchange of information allows the MCDs 2105 and 2107 to set up a communication channel using a different, higher-bandwidth (and slightly longer-range) short-range communications protocol, such as Bluetooth or Wi-fi Direct for the remainder of the transaction, though establishing such a secondary channel is unnecessary. In any event, before or after establishing the communication channel, the seller may provide input to his or her MCD 2107 specifying information about the financial transaction. Such information may include the amount owed/to be payed (i.e., the amount of financial assets to be transferred), but also possibly including other information, such as the goods or services being bought. Once the information is entered, the seller may provide input directing the mobile wallet logic 1408 running on the MCD 2107 to send the details of the transaction to the MCD 2105 and prompt the user of the MCD 2105 to accept and settle (i.e., pay for) the transaction.

Once the details of the transaction are sent from the MCD 2107 to the MCD 2105, the MCD 2105 (specifically, the mobile wallet logic 1408 running on the MCD 2105) may prompt the user to accept or reject the financial transaction. The user may then provide input doing so. As a security measure—in the sense of ensuring that the user meant to accept—the process of settling the "accepted" transaction and transferring the locally stored financial assets to the MCD 2107 may require a final step of the two MCDs again being tapped against one another, as described above. However, this final tapping of the MCDs is unnecessary in other embodiments.

Note that, this sequence of events could differ in various embodiments. For example, in some embodiments the seller could preemptively enter the details of the transaction before initiating the transaction session with the MCD 2105 (i.e., with the buyer). In this case, the buyer may immediately be shown the details of the proposed transactions and prompted to accept or decline them.

Figure 19:
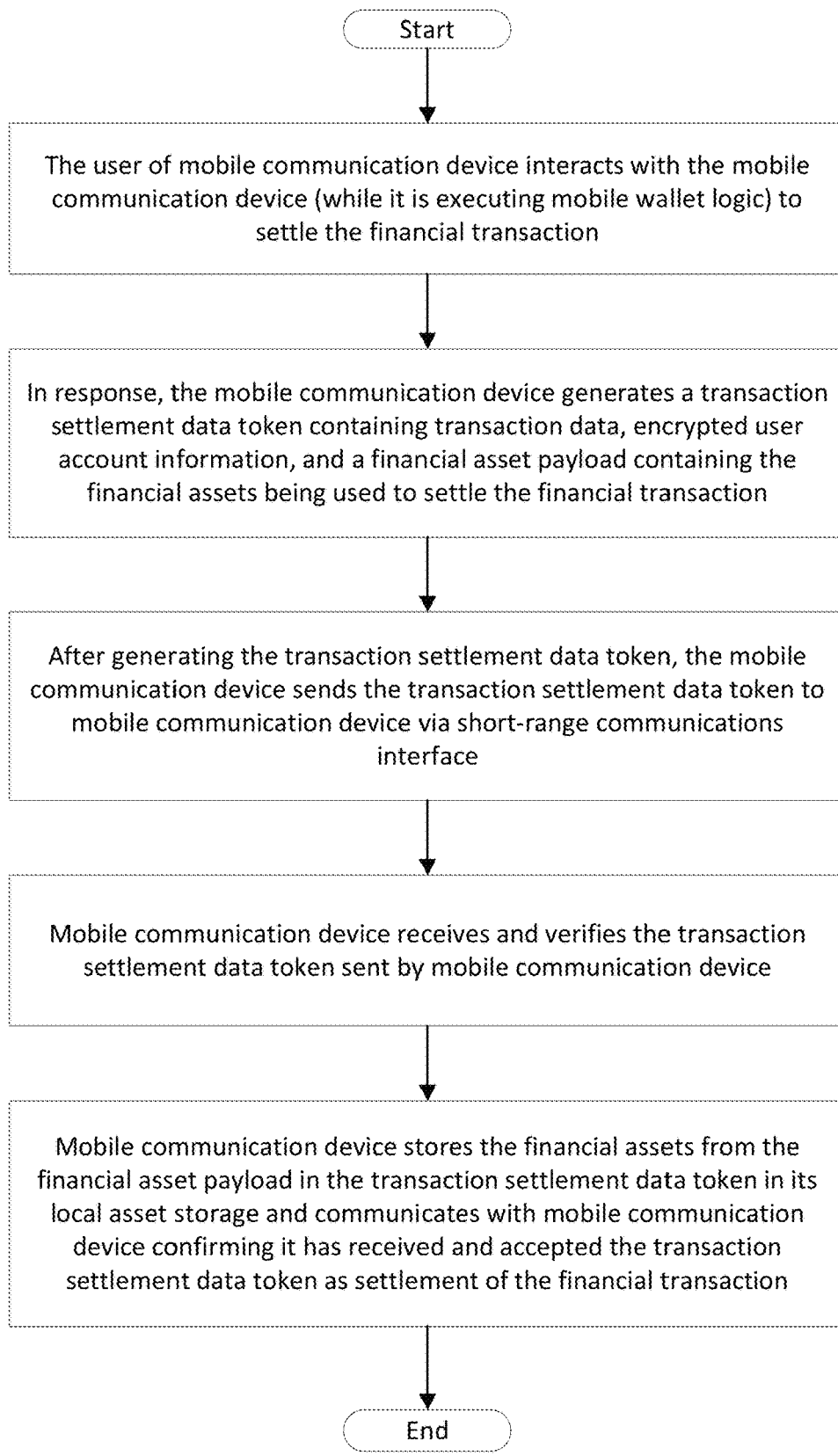
FIG. 19 is a flowchart illustrating an exemplary method of locally settling a financial transaction.

FIG. 19 is a flowchart illustrating a process of locally settling a financial transaction, such as previously described in the third step of FIG. 16. To start, the user of the MCD 2105 interacts with the mobile wallet logic 1408 (running on the MCD 2105) to settle the financial transaction.

After the user of the MCD 2105 interacts with mobile wallet logic 1408 (running on the MCD 2105) to settle the financial transaction, the mobile wallet logic 1408, in response, generates a transaction settlement data token 2002 containing a header 2003, transaction data 2004, encrypted user account information 2005, and a financial asset payload 2006 containing the financial assets 2007 being used to settle the financial transaction. Next, the mobile wallet logic 1408 sends the data token to the MCD 2107 via short-range communications interface 1405. The MCD 2107 subsequently receives and verifies the transaction settlement data token 2002 sent by MCD 2105.

The MCD 2107 also stores the financial assets 2007 from the financial asset payload 2006 in the transaction settlement data token 2002 in its local asset storage 1508 and communicates with the MCD 2105 confirming it has received and accepted the transaction settlement data token 2002 as settlement of the financial transaction. At this point, the process shown by FIG. 19 is complete.

Figure 20:
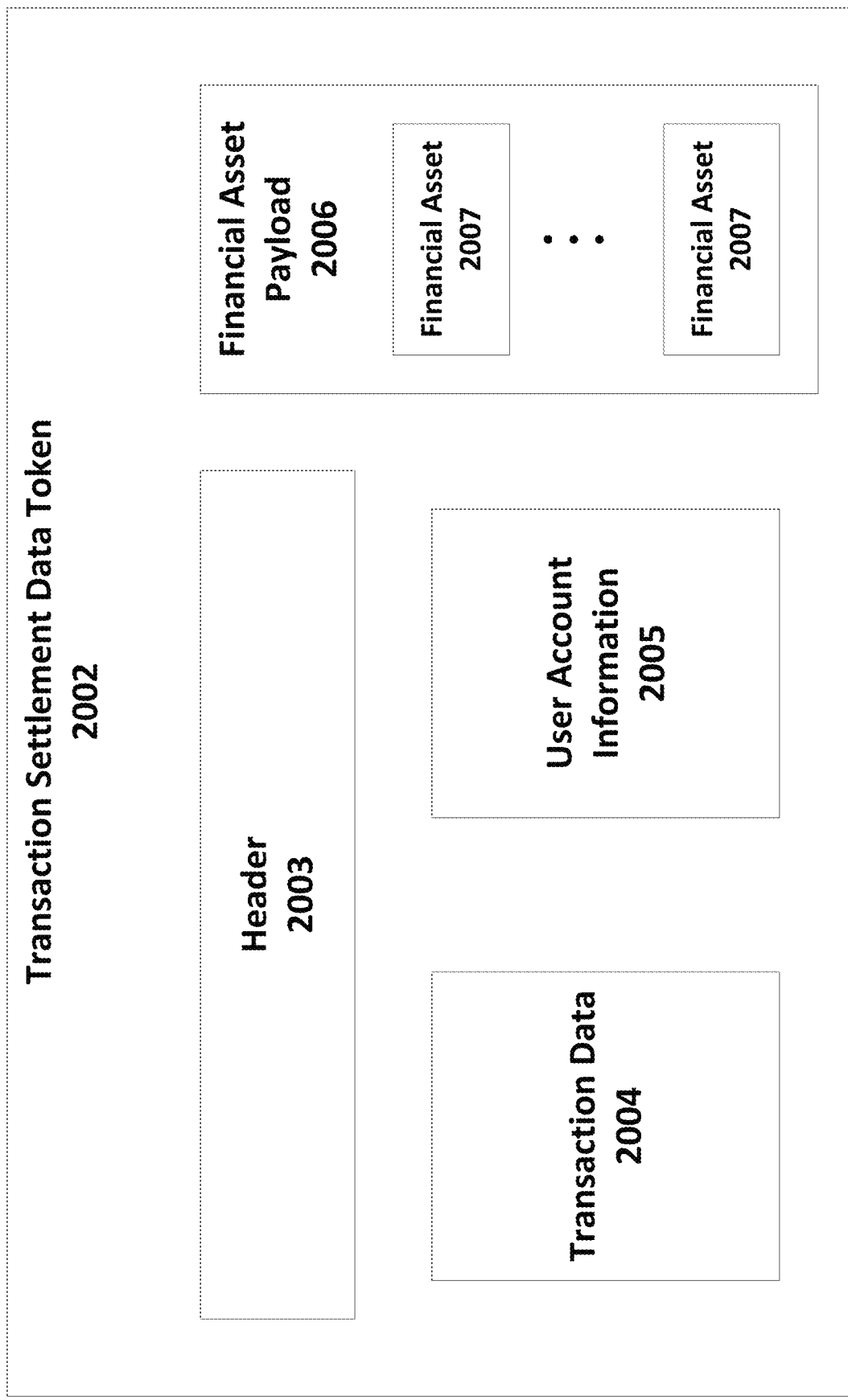
FIG. 20 is a block diagram illustrating a data token used to locally settle a financial transaction, such as the data token described in FIG. 19.

FIG. 20 is a block diagram of a data token used to locally settle a financial transaction, such as the data token described in FIG. 19. As shown by the figure, a transaction settlement data token (TSDT) 2002 may comprise a header 2003, transaction data 2004, user account information 2005, and a financial asset payload 2006. The header 2003 may contain technical information usable by a MCD 1402 (e.g., MCD 2107) to identify and process the transaction TSDT 2002. In contrast, the transaction data 2004 may contain data detailing specifics about the financial transaction being settled, such as the dollar amount owed, the time of the transaction, etc. The financial asset payload 2006 may contain one or more financial assets 2007 which, as discussed above, are being transferred from the MCD 2105 to the MCD 2107 to settle the financial transaction.

Relatedly, the user account information 2005 contains information identifying the user account from which the financial assets 2007 were transferred. As an example, for the transaction discussed in FIG. 16, the user account information 2005 contains information about user account 1510 at the financial service provider 1517 (that is accessible and controlled by financial service provider system 2103), since it is this account from which the financial assets were transferred. Thus, the user account information 2005 may contain identifying information about the user account 1510, such as the account number. The user account information 2005 may also contain information related to the user account 1510, such as the identity of the financial service provider 1517 (or, similarly, the identity of the financial service provider system 2103) or the identity (e.g., name) of the owner of the user account 1510. Note that, in some embodiments the transaction settlement data token 2002 may not include the header 2003 or the transaction data 2004.

In some embodiments, the user account information 2005 may be encrypted before being sent to the MCD 2107 such that only other financial service providers (or similar financial institutions) can decrypt and retrieve the associated data. This is useful to preserve the anonymity of the user of the MCD 2105 relative to the user of the MCD 2107 while still allowing the owner of the MCD 2107 (and of user account 1512) to have recourse—via their financial service provider 1518 (i.e., the entity associated with the financial service provider system 2109)—in the case of a fraudulent double-spend attack.

One aspect of the transaction settlement data token is how the financial assets 2007 may be structured so as to enable an offline transfer of value. In some embodiments, the financial asset 2007 may be structured or represented as un-submitted but fully authenticated and valid transaction transferring an appropriate amount of financial assets.

For example, if the financial assets being transferred are a cryptocurrency, the financial assets 2007 may comprise an un-submitted but fully authenticated and valid cryptocurrency transaction transferring an appropriate amount of cryptocurrency. As a more concrete example, if the financial assets being transferred are Bitcoins, the financial assets 2007 may comprise an un-submitted but fully authenticated and valid cryptocurrency transaction transferring an appropriate amount of cryptocurrency from a Bitcoin address to some other Bitcoin address.

The nature of these un-submitted but fully authenticated cryptocurrency transactions, along with the Bitcoin address they are being sent from and the Bitcoin address they are being sent to, may vary depending on different design decisions. These different designs may affect the ease of use of the system and its relative robustness against fraud, and may be made on the basis of balancing these factors.

For example, in some embodiments, each of the financial assets stored on the local asset storage 1506 of the MCD 2105 may be a private key associated with a corresponding Bitcoin address having a certain (preferably but not necessarily standardized) amount of Bitcoins. In embodiments using this approach, a financial asset 2007 may be an un-submitted but fully authenticated transaction transferring the Bitcoins from one of these Bitcoin addresses (that has not been used previously and is not being simultaneously used by another financial asset 2007). Multiple of these financial assets 2007 may be used to meet or exceed the necessary amount of value to be transferred. In a case where the transaction contains more value than is necessary for the present transaction, the remaining value of Bitcoin may be transferred in a second output to a Bitcoin address controlled by the user of the MCD 2105.

Also for embodiments using this approach, one Bitcoin address that the un-submitted but fully authenticated transaction specifies in its output may vary. In some embodiments, the MCD 2105 may itself create a new public-private key pair (with the public key being the new Bitcoin address) and use the newly created Bitcoin address as the output destination of the un-submitted but fully authenticated transactions. In this case, the MCD 2105 may include as part of the financial asset payload 2006 the private key corresponding to the newly created Bitcoin address. The user of the mobile device 2107 may then utilize this private key to generate a second cryptocurrency transaction to transfer the cryptocurrency assets from the newly created cryptocurrency address to an address of his or her choosing. The MCD 2107 may then later submit both these transactions to the broader Bitcoin network.

Alternatively, in some embodiments the MCD 2105 may request the MCD 2107 to specify the Bitcoin address (i.e., a public key to require in the locking script) that the un-submitted but fully authentication transactions should specify in their output. The MCD 2107 could provide this information, either by referencing the public key of an existing Bitcoin address or generating a new public-private key pair.

Also note that, in some embodiments, the TSDT 2002 may include information about a backing financial institution guaranteeing the funds being transferred. This may be accompanied by a signature that could be verified by the MCD 2107. This guarantee may be in the form of a promise to pay the recipient (i.e., the user of the MCD 2107) even in the case of a fraudulent double-spend attack or to guarantee that a certain amount of funds of the user of the MCD 2105 are being held for a certain amount of time for the same purpose. The benefit of this inclusion is that the presence of a large (and presumably trust-worthy) financial institution guaranteeing payment may make the user of a MCD 2107 more willing to accept the financial assets 2007 as payment. This guarantee may, in some embodiments, include a timestamp and a caveat that it is only valid for a certain duration starting from that time, which may essentially require or encourage the user of the MCD 2107 to connect to a network within that duration.

In some embodiments, the mobile wallet logic 1408 running on the MCD 2105 could be configured to display a notification to a user that a peer-to-peer transaction has occurred that has not yet been finalized with the relevant financial institutions. In some embodiments, a peer-to-peer transaction may be finalized when the MCD 2107 transfers the financial assets received from the MCD 2105 to the user account 1512 associated with the MCD 2107. When the financial service provider 1518 (i.e., when the financial service provider system 2109) receives and verifies the transferred financial assets, the financial service provider system 2109 may communicate with the financial service provider system 2103 over communication channel 1516 to inform the financial service provider system 2103 that it has accepted the financial assets that originated from user account 1510. Subsequently, the financial service provider system 2103 may communicate with the MCD 2105 (specifically, with the mobile wallet logic 1408 running on the MCD 2105) that the relevant peer-to-peer financial transaction has been finalized. The MCD 2105 may then display an updated notification to the user indicating that the peer-to-per transaction has been formally accepted and finalized.

In some embodiments, the financial assets being transferred from the user account 1510 at the financial service provider 1517 may comprise one or more cryptocurrencies. In addition, one or more of the cryptocurrency financial assets may be associated with a cryptocurrency address. The cryptocurrency address may be configured such that it has an associated pool of private keys of which a quorum is required to approve and effectuate a transfer of the cryptocurrency assets associated with the cryptocurrency address, as described above with reference to cryptocurrency management system 102. In this regard, the same techniques described above for authenticating a transfer of digital currency in a cryptocurrency management system 102 depicted by FIG. 1 may be used to authorize a transfer of cryptocurrency from the financial service provider system 2103 (specifically from the user account 1510 at the financial service provider system) to the MCD 2105. As an example, the MCD 2105 may function in the same manner described above for the MCD 105 of FIG. 1 for the authorization. However, in other embodiments, use of such transfer authorization techniques is unnecessary. In another example, similar techniques may be used to authorize a transfer of cryptocurrency from the MCD 2105 to the MCD 2107.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Now, therefore, the following is claimed:

1. A method for locally authenticating an anonymous peer-to-peer transaction, the method comprising:
    displaying, on a user interface presented by a display of a first mobile communication device (MCD), an account value of financial assets stored within a first user account at a first financial service provider system, wherein at least a subset of the financial assets stored within the first user account are stored in a remote storage associated with the first financial service provider system, wherein the financial assets include a cryptocurrency;
    initiating, in response to user input received via the user interface, a communication request to transfer a specified value of financial assets through a communication network from the remote storage at the first user account at the first financial service provider system into local asset storage in a non-volatile memory of the first MCD that is configured to conduct at least one local transaction via a near-field wireless channel, wherein the user input is associated with the at least one local transaction;
    upon receiving an acknowledgement communication from the first financial service provider system, increasing
    a balance of locally stored financial assets based on the specified value of the financial assets received in the acknowledgement communication by storing the financial assets in the local asset storage in the non-volatile memory of the first MCD, wherein the acknowledgement communication further causes the first user account to be debited the specified value;
    initiating a transaction settlement protocol to transfer a first value from the locally stored financial assets on the first MCD to a second MCD over the near-field wireless channel based on a proximity between the first MCD and the second MCD and a secure transaction session of the transaction settlement protocol;

upon receiving an authenticated transaction settlement communication from the second MCD, generating a transaction settlement data token comprising transaction data containing information specific to a local transaction request associated with the at least one local transaction, the first value, and encrypted personal information relating to the first user account at the first financial service provider system, wherein the encrypted personal information is associated with an identity verification;

transmitting the transaction settlement data token to the second MCD over the near-field wireless channel;

receiving, at the first MCD over the near-field wireless channel, confirmation of transmission of the transaction settlement data token from the second MCD, wherein the second MCD verifies the transaction settlement data token prior to sending the confirmation of transmission; and debiting the locally stored financial assets stored on the first MCD according to the first value upon receiving the confirmation of transmission.

2. The method of claim 1, further comprising:

upon receiving the confirmation of transmission of the transaction settlement data token to the second MCD, updating the user interface to present a visual identifier indicating that an unsettled peer-to-peer transaction is pending final settlement with a second financial service provider system associated with the second MCD; and upon receiving a transaction settled notification from the first financial service provider system, updating the visual identifier presented by the user interface to indicate that the unsettled peer-to-peer transaction has fully settled to a second user account at the second financial service provider system associated with the second MCD.

3. The method of claim 1, wherein the first value being transferred comprises at least one un-submitted but fully authenticated transaction with an output specifying a second user account at a second financial service provider system linked to the second MCD.

4. The method of claim 1, further comprising:

displaying, on the user interface presented by the display of the first MCD, a list indicating a plurality of MCDs within range of the first MCD, wherein the plurality of MCDs includes the second MCD; and in response to receiving, via the user interface, user input selecting the second MCD from the list, sending, from the first MCD to the second MCD over the near-field wireless channel, a request for a transaction session.

5. The method of claim 4, further comprising:

responsive to receiving confirmation from the second MCD of receiving and accepting the request for the transaction session:

updating the user interface to indicate the request for the transaction session was accepted; and further updating the user interface to receive input from a user of the first MCD (1) specifying details about a proposed financial transaction and (2) indicating the proposed financial transaction is finalized and ready for settlement.

6. The method of claim 1, wherein:

the financial assets stored within the first user account comprise one or more cryptocurrency tokens associated with a cryptocurrency address of a cryptocurrency network;

a transfer of the one or more cryptocurrency tokens from the first user account requires the transfer to be authenticated by obtaining at least a minimum-threshold number of authenticating signatures sufficient to form a quorum of authenticating signatures, wherein:

the quorum of authenticating signatures includes a first authenticating signature and either a second authenticating signature or a third authenticating signature;

the first authenticating signature is generated using a first authenticating key share from a pool of authenticating key shares associated with the cryptocurrency address;

the second authenticating signature is obtained from a cryptocurrency management device (CMD) and is generated using a second authenticating key share from the pool of authenticating key shares, wherein the second authenticating key share is stored on the CMD; and the third authenticating signature is obtained from a cryptocurrency management server (CMS) and is generated using a third authenticating key share from the pool of authenticating key shares, wherein the third authenticating key share is stored on the CMS; and the method further comprises:

storing, in the non-volatile memory of the first MCD, the first authenticating key share;

prior to sending the communication request to import the specified value of financial assets:

initiating a transaction involving one or more cryptocurrency tokens associated with the cryptocurrency address; and obtaining at least the minimum-threshold number of authenticating signatures sufficient to form the quorum of authenticating signatures by communicating with either the CMD or the CMS;

generating an authenticated transaction using the quorum of authenticating signatures; and attaching to the communication request to import the specified value of financial assets the authenticated transaction.

7. The method of claim 6, wherein the obtaining comprises:

transmitting a signature request comprising authenticating information and transaction information from the first MCD to the CMS, wherein the authenticating information is sufficient to authenticate the first MCD to the CMS and the transaction information comprises information detailing the initiated transaction; and receiving, at the first MCD from the CMS, a signature reply comprising the third authenticating signature, wherein the signature reply was generated by the CMS using the transaction information and the CMS required the initiated transaction to conform to a transaction policy associated with the cryptocurrency address before the CMS generated the third authenticating signature.

8. The method of claim 6, wherein the obtaining comprises:

transmitting a signature request comprising authenticating information and transaction information from the first MCD to the CMD, wherein the authenticating information is sufficient to authenticate the first MCD to the CMD and the transaction information comprises information detailing the initiated transaction; and receiving, at the first MCD from the CMD, a signature reply comprising the second authenticating signature, wherein the signature reply was generated by the CMD using the transaction information and the CMD required a user to provide biometric information directly to the CMD before the CMD generated the second authenticating signature.

9. A method for authenticating a local peer-to-peer transaction using a first mobile communication device (MCD), the method comprising:
receiving, with the first MCD through a communication network, financial assets from a first user account at a first financial service provider system of a first financial service provider, wherein at least a subset of the financial assets are transferred from a remote storage of the first user account associated with the first financial service provider system, wherein the financial assets include a cryptocurrency;
storing the financial assets in local asset storage located in a non-volatile memory of the first MCD that is configured to conduct at least one local transaction, wherein the local asset storage is linked to the first user account;
initiating a local financial transaction associated with the at least one local transaction with a second MCD using a near-field wireless channel between the first MCD and the second MCD, wherein the local financial transaction is for a specified monetary value; and
settling the local financial transaction using the financial assets stored in the local asset storage by:
generating, at the first MCD, a transaction settlement data token comprising transaction data, encrypted personal information, and a portion of financial assets associated with the specified monetary value, wherein the encrypted personal information is associated with an identity verification;
transferring at least the portion of the financial assets from the local asset storage to the second MCD by transmitting the transaction settlement data token to the second MCD over the near-field wireless channel based on a proximity between the first MCD and the second MCD and a secure transaction session of a transaction settlement protocol; and
upon receiving confirmation of transmission of the transaction settlement data token from the second MCD, removing the portion of the financial assets included in the transaction settlement data token from the local asset storage.

10. The method of claim 9, wherein the portion of the financial assets being transferred comprises at least one un-submitted but fully authenticated transaction with an output specifying a second user account at a second financial service provider.

11. The method of claim 9, wherein the method further comprises:
receiving, at the first MCD in a first near-field communication (NFC) tap between the first MCD and the second MCD, a first identifier associated with the second MCD;
receiving, at the first MCD in a second NFC tap between the first MCD and the second MCD, a second identifier associated with the second MCD; and
comparing, at the first MCD, the first identifier and the second identifier, wherein the transferring at least the portion of the financial assets is performed in the second NFC tap based on the comparing.

12. The method of claim 9, further comprising:
displaying, on a user interface of the first MCD, a list indicating a plurality of MCDs within range of the first MCD, wherein the plurality of MCDs includes the second MCD; and
responsive to receiving input selecting the second MCD from the list, sending, from the first MCD to the second MCD over the near-field wireless channel, a request for a transaction session.

13. The method of claim 9, further comprising:
receiving, at the first MCD, a message from the second MCD specifying details about the local financial transaction;
displaying, at the first MCD, the details about the local financial transaction; and
displaying, at the first MCD, a prompt requesting a user to accept the local financial transaction.

14. A first mobile communication device (MCD) for authenticating a local peer-to-peer transaction, comprising:
network interface circuitry configured to communicate with a first financial service provider system of a first financial service provider over a communication network;
near-field communications interface circuitry configured to communicate with a second MCD over a near-field wireless channel;
a non-volatile memory of the first MCD that includes local asset storage configured to store a balance of locally stored assets transferred from a first user account at the first financial service provider system, wherein the locally stored assets are transferred from a remote storage of the first user account associated with the first financial service provider system; and
at least one processor configured to:
receive financial assets from the remote storage of the first user account associated with the first financial service provider system through the communication network, wherein the financial assets include a cryptocurrency;
store the financial assets in the local asset storage in the non-volatile memory of the first MCD;
initiate a local financial transaction with the second MCD via communications using the near-field communications interface circuitry, wherein the local financial transaction is for a specified monetary value; and
settle the local financial transaction using the financial assets stored in the local asset storage by:
generating a transaction settlement data token comprising transaction data, encrypted personal information, and a portion of financial assets associated with the specified monetary value, wherein the encrypted personal information is associated with an identity verification;
transferring at least the portion of the financial assets from the local asset storage to the second MCD by transmitting the transaction settlement data token to the second MCD using the near-field communications interface circuitry based on a proximity between the first MCD and the second MCD and a secure transaction session of a transaction settlement protocol; and
upon receiving confirmation of transmission of the transaction settlement data token to the second MCD, removing the portion of financial assets included in the transaction settlement data token from the local asset storage.

15. The first mobile communication device of claim 14, wherein the portion of the financial assets being transferred comprises at least one un-submitted but fully authenticated transaction with an output specifying a second user account at a second financial service provider.

16. The first mobile communication device of claim 14, wherein the at least one processor is further configured to:
    receive, using the near-field communications interface circuitry in a first NFC tap between the first MCD and the second MCD, a first identifier associated with the second MCD;
    receive, using the near-field communications interface circuitry in a second NFC tap between the first MCD and the second MCD, a second identifier associated with the second MCD;
    compare the first identifier and the second identifier; and
    transfer at least the portion of the financial assets to the second MCD in the second NFC tap based on a comparison of the first identifier and the second identifier.

17. The first mobile communication device of claim 14, wherein the at least one processor is further configured to:
    display, on a user interface of the first MCD, a list indicating a plurality of MCDs within range of the first MCD, wherein the plurality of MCDs includes the second MCD; and
    in response to receiving input selecting the second MCD from the list, send a communication request from the first MCD to the second MCD requesting a transaction session using the near-field wireless channel.

18. The first MCD of claim 14, wherein the at least one processor is further configured to:
    receive a message from the second MCD specifying details about the local financial transaction;
    display, at the first MCD, the details about the local financial transaction; and
    display, at the first MCD, a prompt requesting a user to accept the local financial transaction.

* * * * *